(12) United States Patent
Ogawa et al.

(10) Patent No.: US 8,184,944 B2
(45) Date of Patent: May 22, 2012

(54) RECORDING MEDIUM, RECORDING DEVICE, RECORDING METHOD, AND PLAYBACK DEVICE

(75) Inventors: Tomoki Ogawa, Osaka (JP); Hiroshi Yahata, Osaka (JP); Kazuhiro Mochinaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 467 days.

(21) Appl. No.: 12/424,064

(22) Filed: Apr. 15, 2009

(65) Prior Publication Data

US 2009/0279869 A1 Nov. 12, 2009

Related U.S. Application Data

(60) Provisional application No. 61/045,512, filed on Apr. 16, 2008.

(51) Int. Cl.
*H04N 9/80* (2006.01)
(52) U.S. Cl. ............. 386/241; 386/248; 386/E5.001
(58) Field of Classification Search .............. 386/241, 386/248, E5.001
See application file for complete search history.

(56) References Cited

U.S. PATENT DOCUMENTS

2007/0160350 A1* 7/2007 Ikeda et al. .................... 386/99
2008/0304814 A1 12/2008 Fujii et al.

FOREIGN PATENT DOCUMENTS

| JP | 2007-310977 | 11/2007 |
| JP | 2007-310997 | 11/2007 |
| JP | 2008-77775 | 4/2008 |
| WO | 2004/114658 | 12/2004 |

OTHER PUBLICATIONS

International Search Report issued Jun. 2, 2009 in the corresponding International (PCT) Application.

* cited by examiner

*Primary Examiner* — Thai Tran
*Assistant Examiner* — Girumsew Wendmagegn
(74) *Attorney, Agent, or Firm* — Wenderoth Lind & Ponack, L.L.P.

(57) ABSTRACT

A recording medium having recorded thereon one or more pieces of playlist information each of which includes a stream table including multiple stream entries. Each audio stream has been encoded in one of a mandatory format that is an encoding format decodable by a playback apparatus with any version number, and an optional format that is an encoding format decodable by a playback apparatus with a predetermined or higher version number. In a first-type stream table, a stream entry corresponding to an audio stream encoded in the optional format is immediately subsequent, in the order of the stream entries, to a stream entry corresponding to an audio stream encoded in the mandatory format, the audio stream encoded in the optional format and the audio stream encoded in the mandatory format having been encoded from a same audio source and having a same language code and a same number of channels.

8 Claims, 28 Drawing Sheets

FIG. 5

| | |
|---|---|
| | ES_TABLE_length |
| | number_of_video_stream_entries |
| | number_of_audio_stream_entries |
| | number_of_PG_stream_entries |
| video_streams permitted to be played back by PlayItem | number_of_IG_stream_entries |
| | stream_entry-stream_attributes(id=1) |
| | stream_entry-stream_attributes(id=1) |
| Primary audio streams permitted to be played back by PlayItem | stream_entry-stream_attributes(id=2) |
| | stream_entry-stream_attributes(id=3) |
| | stream_entry-stream_attributes(id=4) |
| | : |
| | stream_entry-stream_attributes(id=j) |
| | stream_entry-stream_attributes(id=1) |
| PG_streams permitted to be played back by PlayItem | stream_entry-stream_attributes(id=2) |
| | stream_entry-stream_attributes(id=3) |
| | stream_entry-stream_attributes(id=4) |
| | : |
| | stream_entry-stream_attributes(id=k) |
| IG_streams permitted to be played back by PlayItem | stream_entry-stream_attributes(id=1) |
| | stream_entry-stream_attributes(id=2) |

FIG. 6A

Stream_entry ()

| length |
|---|
| ref_to_Stream_PID_of_Main_Clip |

FIG. 6B

Stream_attributes ()

| Stream_attributes_length |
|---|
| coding_type |
| presentation_type |
| sampling_frequency |
| audio_language_code |

FIG. 11A

PSR1:Primary Audio Stream Number

| b31 | b30 | b29 | b28 | b27 | b26 | b25 | b24 |
|-----|-----|-----|-----|-----|-----|-----|-----|
| reserved ||||||||
| b23 | b22 | b21 | b20 | b19 | b18 | b17 | b16 |
| reserved ||||||||
| b15 | b14 | b13 | b12 | b11 | b10 | b9 | b8 |
| reserved ||||||||
| b7 | b6 | b5 | b4 | b3 | b2 | b1 | b0 |
| Primary audio stream number ||||||||

Primary audio stream
number ··· 0:Reserved
1 to 32:Primary audio stream number
0xFF:Primary audio stream is not selected
or no Primary audio stream

FIG. 11B

PSR15:Player Capability for Audio

| b31 | b30 | b29 | b28 | b27 | b26 | b25 | b24 |
|-----|-----|-----|-----|-----|-----|-----|-----|
| reserved |||| reserved ||||
| b23 | b22 | b21 | b20 | b19 | b18 | b17 | b16 |
| reserved |||| DRA capability |||
| ^ | ^ | ^ | ^ | DRA Extension || DRA Core |
| b15 | b14 | b13 | b12 | b11 | b10 | b9 | b8 |
| Dolby Lossless capability |||| DTS-HD capability ||||
| b7 | b6 | b5 | b4 | b3 | b2 | b1 | b0 |
| Dolby Digital plus capability |||| LPCM capability ||||

FIG. 11C

PSR31:Player Profile/Player Version

| b31 | b30 | b29 | b28 | b27 | b26 | b25 | b24 |
|-----|-----|-----|-----|-----|-----|-----|-----|
| reserved ||||||||
| b23 | b22 | b21 | b20 | b19 | b18 | b17 | b16 |
| reserved |||| Player Profile ||||
| b15 | b14 | b13 | b12 | b11 | b10 | b9 | b8 |
| Player Version ||||||||
| b7 | b6 | b5 | b4 | b3 | b2 | b1 | b0 |
| Player Version ||||||||

Player Version ··· 0000 0010 0000 0000b:Version2.0X, 2.1Xor2.2X
0000 0010 0011 0000b:Version2.3

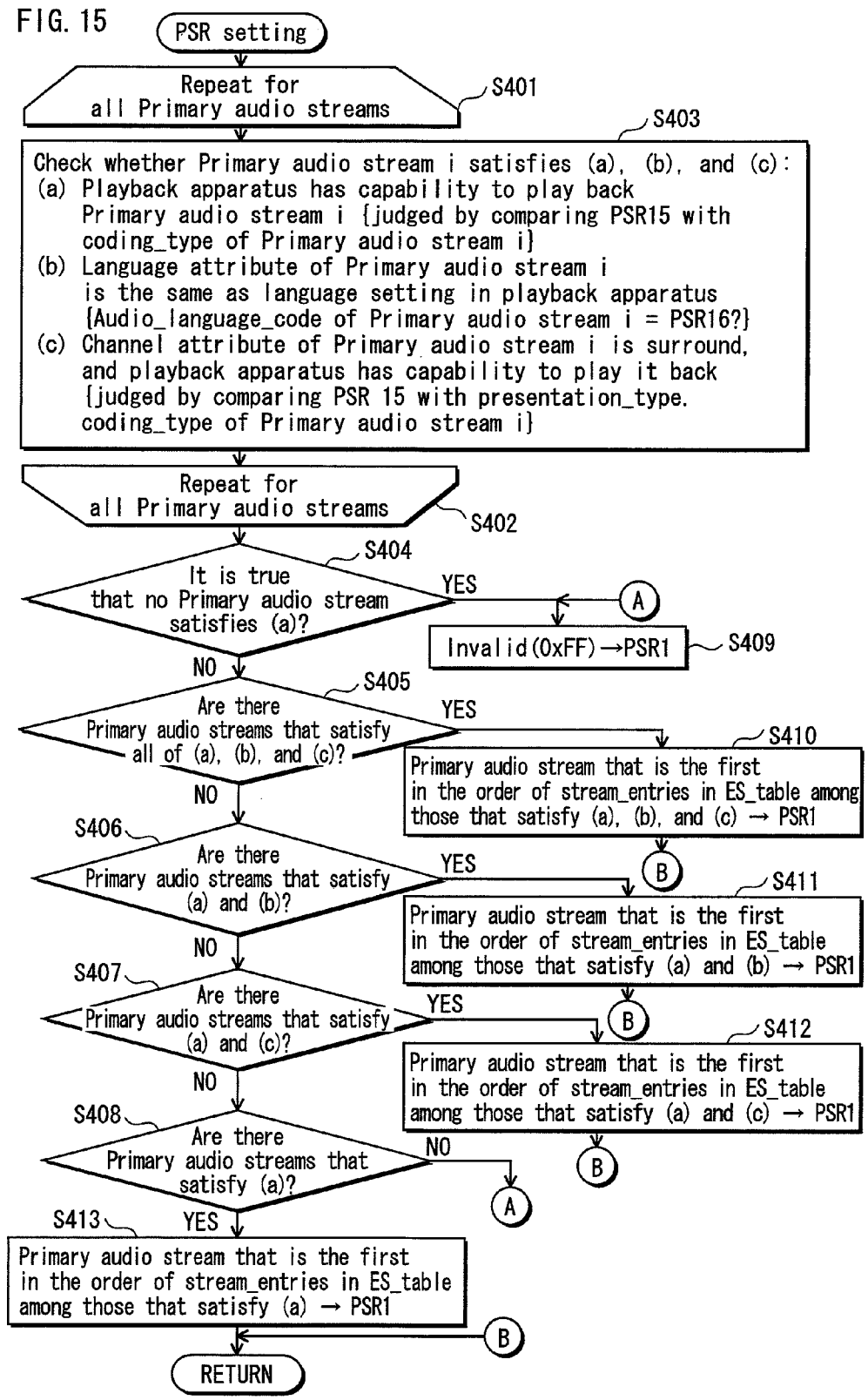

FIG. 18A

Presentation Capability(PSR 15) = LPCM ○ AC-3 ○ NAC ×
Language Setting(PSR 16) = Japanese
Surround Capability(PSR 15) = Available

FIG. 18B

| | Codec | Channel | Language |
|---|---|---|---|
| Audio Stream 1 | AC-3 | 2ch | English |
| Audio Stream 2 | AC-3 | 5.1ch | English |
| Audio Stream 3 | NAC | 5.1ch | English |
| Audio Stream 4 | AC-3 | 2ch | Japanese |
| Audio Stream 5 | AC-3 | 5.1ch | Japanese |
| Audio Stream 6 | NAC | 5.1ch | Japanese |

FIG. 18C

| | Codec | Channel | Language | Check Presentation capability (a) | Check language (b) | Check surround capability (c) | Priority order |
|---|---|---|---|---|---|---|---|
| Audio Stream 1 | AC-3 | 2ch | English | ○ | × | × | 4 |
| Audio Stream 2 | AC-3 | 5.1ch | English | ○ | × | ○ | 3 |
| Audio Stream 3 | NAC | 5.1ch | English | ○ | × | ○ | 3 |
| Audio Stream 4 | AC-3 | 2ch | Japanese | ○ | ○ | × | 2 |
| Audio Stream 5 | AC-3 | 5.1ch | Japanese | ○ | ○ | ○ | 1 |
| Audio Stream 6 | NAC | 5.1ch | Japanese | ○ | ○ | ○ | 1 |

Because the priorities are the same, Audio Stream 5 which is higher in order of entry in ES_table is selected.

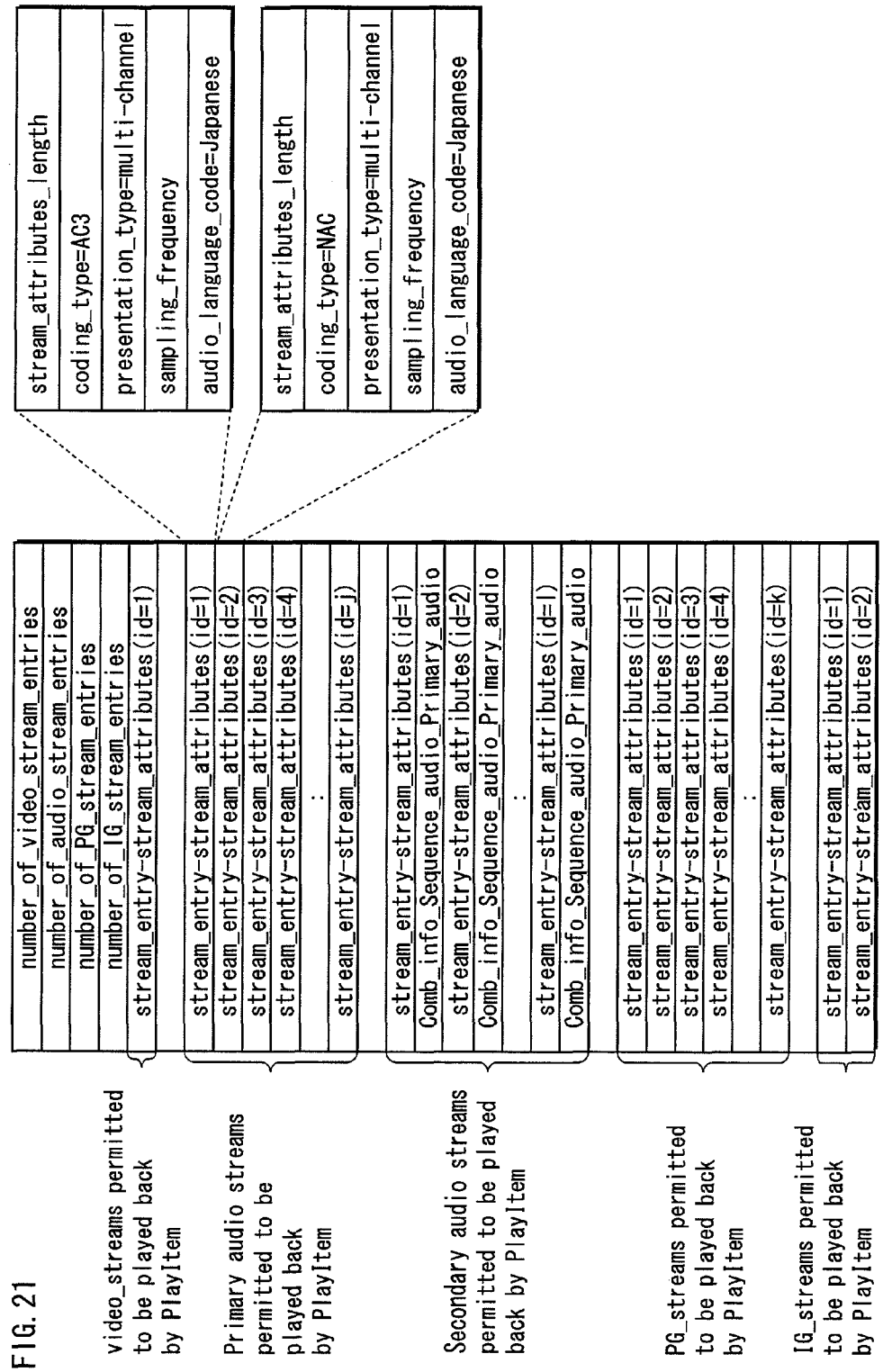

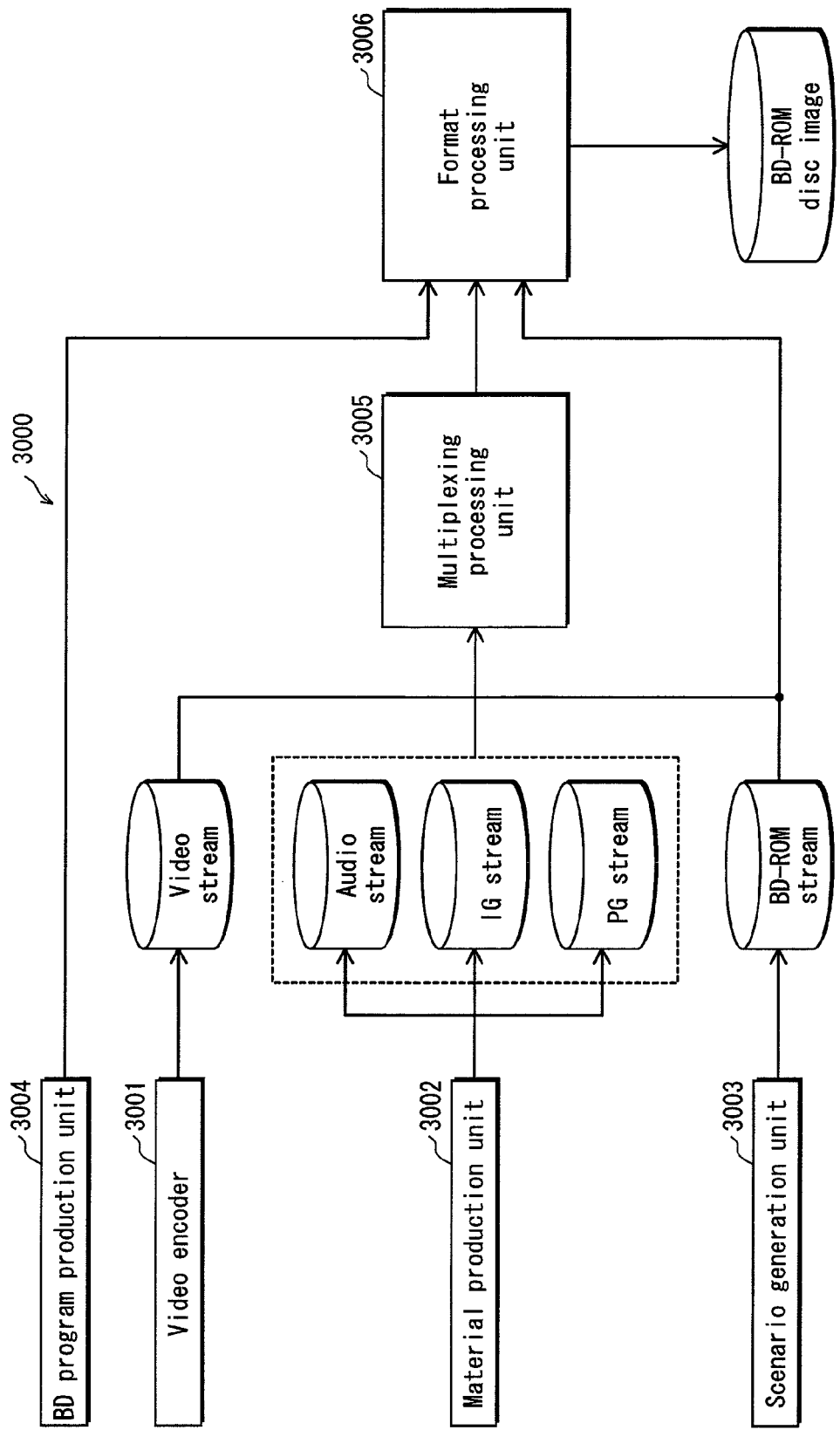

FIG. 24

```
stream_attributes()
```

| stream_attributes_length |
| coding_type |
| if(coding_type==MPEG4, MPEG2, orVC1) { |
|   video_format |
|   frame_rate |
| } |
| else if(coding_type==AC3, DTS, LPCM, orNAC) { |
|   presentation_type |
|   sampling_frequency |
|   audio_language_code |
| } |
| else if(coding_type==PG stream) { |
|       PG_language_code |
| } |
| else if(coding_type==IG stream) { |
|       IG_language_code |
| } |
| else if(coding_type==subtitle) { |
|         subtitle_language_code |
| } |
| else{ |
|       padding |
| } |

FIG. 25

```
stream_code_info()
```

| stream_code_info_length |
| coding_type |
| if(coding_type==MPEG4, MPEG2, orVC1) { |
|   video_format |
|   frame_rate |
| } |
| else if(coding_type==AC3, DTS, LPCM, orNAC) { |
|   presentation_type |
|   sampling_frequency |
|   audio_language_code |
| } |
| else if(coding_type==PG stream) { |
|     PG_language_code |
| } |
| else if(coding_type==IG stream) { |
|     IG_language_code |
| } |
| else if(coding_type==subtitle) { |
|     subtitle_language_code |
| } |
| else{ |
|     padding |
| } |

FIG. 26

| Code Word (H) | Field Value (X) |
|---|---|
| 0 | A |
| 01 | B |
| 0010 | C |
| 0011 | D |
| 00000 | Other alphabet |

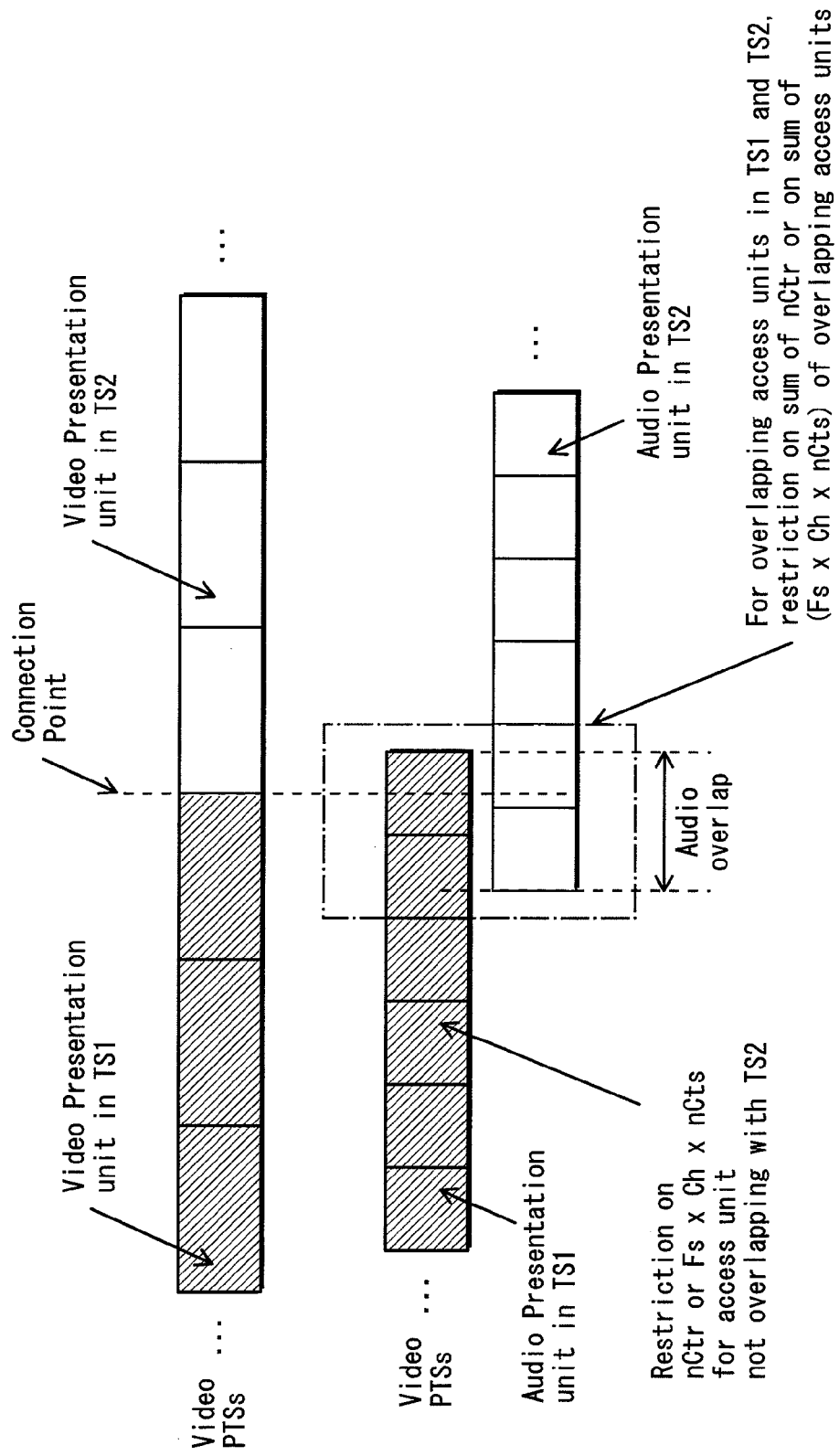

US 8,184,944 B2

RECORDING MEDIUM, RECORDING DEVICE, RECORDING METHOD, AND PLAYBACK DEVICE

This application claims the benefit of U.S. Provisional Application No. 61/045,512, filed Apr. 16, 2008.

BACKGROUND OF THE INVENTION (1) Field of the Invention

The present invention relates to a recording medium in compliance with next-generation DVD standards, in particular to a stream number table defining one or more audio streams that are playable in a predetermined section of a video stream.

(2) Description of the Related Art

In recent years, the next-generation DVD standards, for example, the Blu-ray Disc standard and the HD DVD standard, have been established, familiarizing users with high definition and high quality sound optical discs. In these optical discs, multiple audio streams (e.g., 32 audio streams) are recorded in an attempt to support every combination of encoding format, channel number, and language attribute.

Here, the encoding formats include such as Dolby AC3, Dolby digital Plus, MLP, DTS, DTS-HD, and Linear PCM, and the numbers of channels include such as mono, stereo, and multi-channel.

These optical discs are also recorded with playlist information that includes one or more playback sections (play items) each of which is defined by a playback start point and a playback end point on the time axis of a video stream.

The audio streams recorded on such an optical disc are not playable in every playback section of the video stream. For each playback section, playable audio streams are defined.

This is realized by registering stream numbers of the audio streams that are playable in each playback section into the stream number table corresponding to the playback section.

A playback apparatus selects, in accordance with its playback capability and status setting, the most suitable audio stream to play back out of the audio streams registered in the stream number table corresponding to the playback section (audio stream selection function), and plays back the selected audio stream.

Here, an ordinary audio stream selection function (see Patent Document 1) is described. When selecting an audio stream, the playback apparatus judges, for each of the multiple audio streams registered in the stream number table, which of the following three conditions are satisfied: the playback apparatus has capability to play back the audio stream (condition A); the language attribute of the audio stream matches the language set in the playback apparatus (condition B); and the channel attribute of the audio stream matches the channel attribute set in the playback apparatus (condition C). After that, depending on a pattern of the conditions judged to be satisfied, the playback apparatus assigns a priority to each audio stream, selects one among the multiple audio streams based on the priority, and plays back the selected audio stream.

Specifically, if there is an audio stream that satisfies all of the conditions above, such an audio stream is selected and played back.

If there is no audio stream that satisfies all of these conditions, an audio stream that satisfies the conditions A and B is selected.

If there is no audio stream that satisfies the conditions A and B either, an audio stream that satisfies the conditions A and C is selected.

If there is no audio stream that satisfies the conditions A and C either, an audio stream that satisfies the condition A is selected.

Here, if there are a plurality of audio streams assigned the highest priority, the audio stream to be played back is determined in accordance with the order of the stream numbers in the stream number table. Specifically, the playback apparatus selects the audio stream among the audio streams with the highest priority that is the first in the order of entry in the stream number table.

SUMMARY OF THE INVENTION

In recent years, new encoding formats for audio streams (New Audio Codec, hereinafter referred to as "NAC") have been developed for various purposes. NAC aims to provide compression encoding that achieves higher audio quality, and NAC such as one with a higher compression rate or one with a new function has come into use.

Under these circumstances, there is a need to introduce NAC into the next-generation DVD standards such as the Blu-ray Disc standard and the HD DVD standard to enhance the appeal of the next-generation DVDs.

However, introducing NAC to the existing new-generation DVD standards causes problems concerning compatibility between existing playback apparatuses conforming to the existing next-generation DVD standards and recording media conforming to the next-generation DVD standards including NAC, i.e., the updated version of the next-generation DVD standards.

Specifically, for example, when an existing playback apparatus selects an audio stream using the audio stream selection function, if a stream entry of an audio stream encoded in NAC is included in the stream number table, the playback apparatus is unable to correctly read the attribute information related to NAC and may erroneously select the audio stream encoded in NAC as the audio stream to play back.

The existing playback apparatus, which is unable to decode the audio stream, may then be unable to play back an audio stream in the playback section, bringing discomfort to users as a result.

The present invention aims to provide a recording medium that guarantees a playback of an audio stream by an existing apparatus in a case where a stream entry of an audio stream encoded in NAC is included in a stream number table.

In order to achieve the stated aim, one aspect of the present invention is a recording medium having recorded thereon one or more pieces of playlist information each for defining a playback section on a time axis of a digital stream. Here, each of the pieces of playlist information includes (a) information defining a pair of a playback start point and a playback end point on a time axis of a video stream and (b) a stream table that includes a plurality of stream entries corresponding one-to-one with a plurality of audio streams and that defines an order of the plurality of stream entries; in each stream table, the order of the stream entries indicates a priority, of each of the plurality of audio streams, to which a playback apparatus that plays back the recording medium refers when selecting an audio stream to play back synchronously with the video stream among the plurality of audio streams; each of the plurality of audio streams has been encoded in one of a mandatory format and an optional format, the mandatory format being an encoding format decodable by a playback apparatus with any version number, and the optional format being an encoding format decodable by a playback apparatus with a predetermined or higher version number; and in a first-type stream table included in a piece of first-type playlist information among the pieces of playlist information, a stream entry corresponding to an audio stream encoded in the optional format is immediately subsequent, in the order of the stream entries, to a stream entry corresponding to an audio stream encoded in the mandatory format, the audio stream encoded in the optional format and the audio stream encoded in the mandatory format having been encoded from a same-audio source and having a same language code and a same number of channels.

With the stated structure, even if a conventional playback apparatus erroneously judges itself to be capable of decoding an audio stream encoded in the option format and assigns the highest priority to the audio stream, an audio stream that has been encoded in a conventional encoding format and corresponds to the stream entry immediately before the stream entry of the audio stream encoded in the optional format is also given the highest priority.

This is because the language code and the number of channels of the audio stream encoded in the conventional encoding format are the same as those of the audio stream encoded in the optional format, and in addition, the conventional playback apparatus is capable of decoding the audio stream encoded in the conventional encoding format.

If there are a plurality of audio streams with the highest priority, the audio stream that is the first in the order of the plurality of audio streams with the highest priority, i.e., the audio stream encoded in the conventional encoding format is selected. Accordingly, the audio stream encoded in the optional format will not be selected. Thus, even when playing back a recording medium having recorded thereon a digital stream including an audio stream encoded in an optional format, the conventional playback apparatus selects and decodes an audio stream encoded in a conventional encoding format, thereby guaranteeing a playback of an audio stream.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 5 shows an internal structure of ES_table;
FIG. 6A shows stream_entry for a Primary audio stream;
FIG. 6B shows stream_attributes corresponding to the Primary audio stream;
FIG. 11A shows bit assignment in PSR1;
FIG. 11B shows bit assignment in PSR15;
FIG. 11C shows bit assignment in PSR31;
FIG. 15 is a flowchart showing a detailed-procedure of PSR1 setting (step S305);
FIG. 18A shows Player Capability, language setting, and Surround Capability of a playback apparatus;
FIG. 18B shows recorded content of the ES_table;
FIG. 18C shows stream_entry-stream_attributes of six audio streams;
FIG. 21 shows an internal structure of ES_table in the second embodiment;
FIG. 23 shows an internal structure of a recording apparatus 3000;
FIG. 24 shows a syntax of stream_attributes( );
FIG. 25 shows a syntax of stream_code_inf( );
FIG. 26 is an example of a table indicating correspondence between Huffman-coded values (H) and field values;
FIG. 28 shows a relationship between a Video access unit and an Audio access unit in a case where two pieces of AV data are sequentially played back in compliance with BD-ROM standards.

DESCRIPTION OF THE INVENTION

Figure 1:
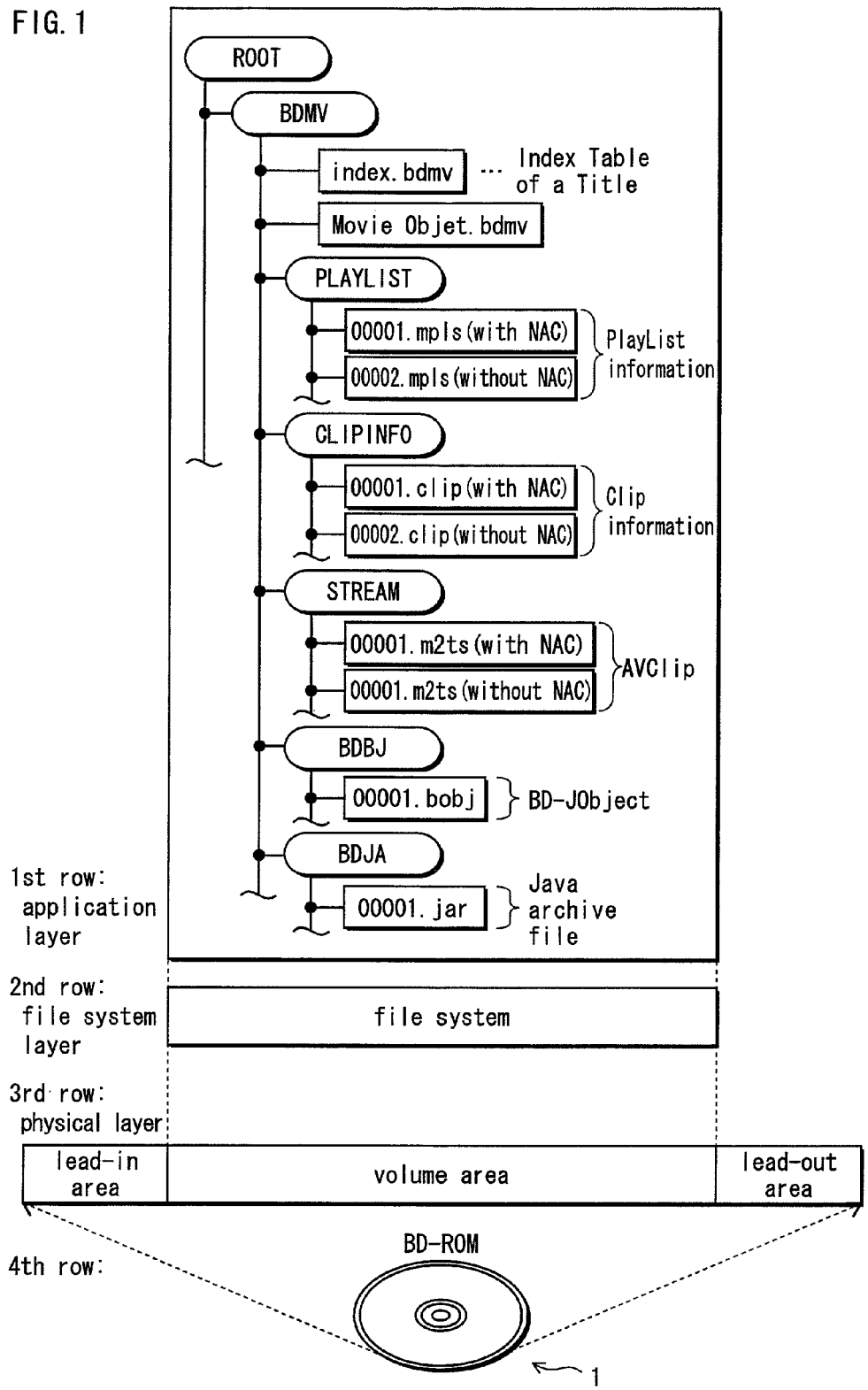
FIG. 1 shows an internal structure of a BD-ROM.

In the following, embodiments of the present invention will be described with reference to the drawings.
(First Embodiment)
1. Internal Structure of BD-ROM
FIG. 1 shows an internal structure of a BD-ROM. The 4$^{th}$ row of FIG. 1 shows the BD-ROM. The 3$^{rd}$ row shows tracks on the BD-ROM. FIG. 1 shows the tracks in the state where they are horizontally extended though they are in reality formed spirally in order from the inner circumference to the outer circumference. The tracks include a lead-in area, a volume area, and a lead-out area. The volume area of FIG. 1 has a layer model that includes a physical layer, a file system layer, and an application layer. The 1$^{st}$ row of FIG. 1 shows an application layer format of the BD-ROM represented by a directory structure. As shown in the figure, the BD-ROM includes a BDMV directory under a root directory.

The BDMV directory includes Index File (index.bdmv), Movie Object file (Movie Object.bdmv), PLAYLIST directory, CLIPINFO directory, STREAM directory, BDBJ directory, and BDJA directory.
1.1. Index File (index.bdmv)
The Index File includes an index table indicating structures of titles. The titles are units of playback, and for example, a main film is recorded in a first title, a director's cut is recorded in a second title, and bonus content is recorded in a third title.

The user can specify a title to play back (e.g. specifying "play back Nth title") using a remote controller or the like provided with the playback apparatus.

1.2. STREAM Directory

Figure 2:
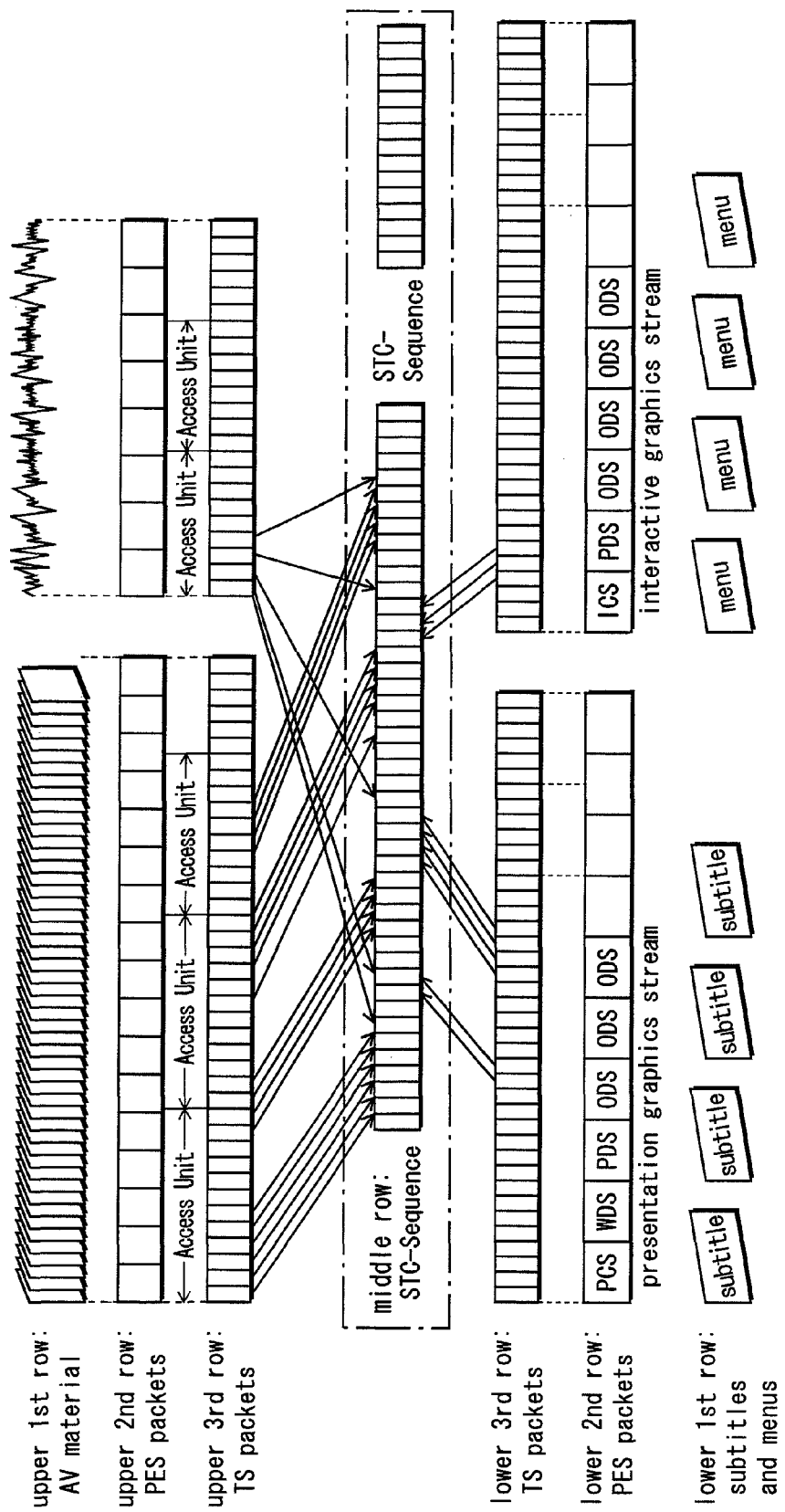
FIG. 2 schematically shows a structure of a file to which an extension "m2ts" is attached.

The STREAM directory includes files to which an extension "m2ts" is attached. FIG. 2 schematically shows the structure of a file to which the extension "m2ts" is attached. The file to which the extension "m2ts" is attached stores an AVClip. The AVClip is a digital stream in the MPEG2-Transport Stream format. As shown by FIG. 2, the digitized video and audio (upper $1^{st}$ row) are converted into an elementary stream composed of PES packets (upper $2^{nd}$ row), and further converted into TS packets (upper $3^{rd}$ row). Similarly, the Presentation Graphics (PG) stream for the subtitles or the like and the Interactive Graphics (IG) stream for the interactive purposes (lower $1^{st}$ row, lower $2^{nd}$ row) are respectively converted into the TS packets ($3^{rd}$ row). The digital stream is generated by multiplexing these TS packets.

Here, as shown by FIG. 1, the STREAM directory stores a file (00001.m2ts (with NAC)) and a file (00002.m2ts (without NAC)). The difference between these two files is whether an audio stream coded using a new audio encoding format (New Audio Codec: hereinafter, referred to as "NAC") (for example, DRA) is included in the digital stream or not. More specifically, all of the audio streams included in the file (00002.m2ts (without NAC)) have been encoded in an existing encoding format such as Dolby AC-3, Dolby Digital Plus, MLP, DTS, DTS-HD or linear PCM (hereinafter, referred to as "conventionally encoded streams"). On the other hand, the file (00001.m2ts (with NAC)) includes, in addition to audio streams encoded in such an existing encoding format, an audio stream encoded in NAC (hereinafter, referred to as "NAC stream").

Now, referring back to FIG. 2, the PG stream is a graphics stream constituting a subtitle. There are a plurality of PG streams that respectively correspond to a plurality of languages (e.g., English, Japanese, and French). Each PG stream is composed of functional segments such as: PCS (Presentation Control Segment); PDS (Pallet Define Segment); WDS (Window Define Segment); ODS (Object Define Segment); and END (END of Display Set Segment). The ODS (Object Define Segment) is a functional segment that defines a graphics object as a subtitle. The WDS is a functional segment that defines a drawing area of a graphics object on the screen. The PDS (Pallet Define Segment) is a functional segment that defines a color in drawing a graphics object. The PCS (Presentation control Segment) is a functional segment that defines a page control in displaying a subtitle. Such page control includes Cut-In/Out, Fade-In/Out, Color Change, Scroll, and Wipe-In/Out. It is possible with the page control by the PCS to achieve a display effect, for example, fading out the current subtitle while displaying the next subtitle.

The IG stream is a graphics stream for achieving an interactive control. The interactive control defined by the IG stream is an interactive control that is compatible with an interactive control on a DVD playback apparatus. The IG stream is composed of functional segments such as: ICS (Interactive Composition Segment); PDS (Palette Definition Segment); ODS (Object Definition Segment); and END (END of Display Set Segment). The ODS (Object Definition Segment) is a functional segment that defines a graphics object. A button on the interactive screen; is drawn by a plurality of such graphics objects. The PDS (Palette Definition Segment) is a functional segment that defines a color in drawing a graphics object. The ICS (Interactive Composition Segment) is a functional segment that achieves a state change in which the button state changes in accordance with a user operation. The ICS includes a button command that is executed when a confirmation operation is performed on a button.

The AVClip is composed of one or more "STC_Sequences". The "STC_Sequence" is a section that does not include a system time-base discontinuity of the System Time Clock (STC), which is the standard time of the system for the AV stream. The system time-base discontinuity of the STC is a point at which the discontinuity_indicator of the PCR packet, which carries the PCR (Program Clock Reference) that is referred to by the decoder to obtain the STC, is ON.

Figure 3:
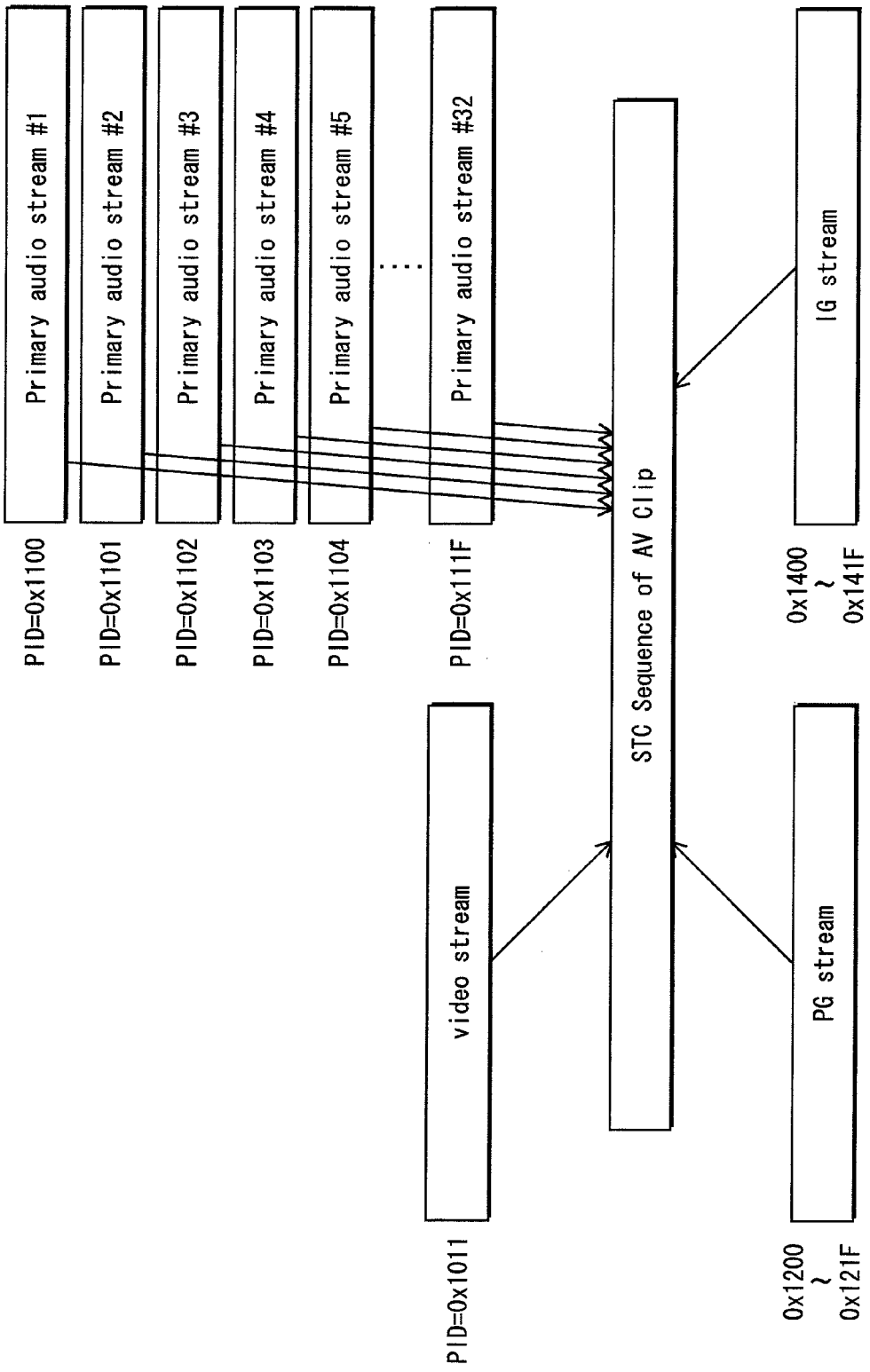
FIG. 3 shows elementary streams that are multiplexed into an AVClip.

Next, FIG. 3 shows the elementary streams that are multiplexed into the AVClip.

As shown in FIG. 3, multiplexed into the AVClip are: a high-image-quality video stream having PID of 0x1011; Primary audio streams having PIDs of 0x1100 to 0x111F; PG streams having PIDs of 0x1200 to 0x121F; and IG streams having PIDs of 0x1400 to 0x141F. The packets constituting the elementary streams are assigned with corresponding PIDs, and demultiplexed based on the PIDs.

1.3. PLAYLIST Directory 1.3.1. Data Structure of Files to which Extension "Mpls" is Attached The PLAYLIST directory stores PlayList files to which an extension "mpls" is attached. Each PlayList file to which the extension "mpls" is attached stores PlayList (PL) information. The PlayList information is information defining a logical playback path of the AVClip.

Here, as shown by FIG. 1, the PLAYLIST directory stores a file "00001.mpls (with NAC)" and a file "00002.mpls (without NAC)". The PlayList information stored in the file "00001.mpls (with NAC)" corresponds to the AVClip stored in the file (00001.m2ts (with NAC)), and includes information on the NAC streams. On the other hand, the file (00002.mpls (without NAC)) corresponds to the AVClip stored in the file (00002.m2ts (without NAC)), and does not include information on the NAC streams.

Figure 4:
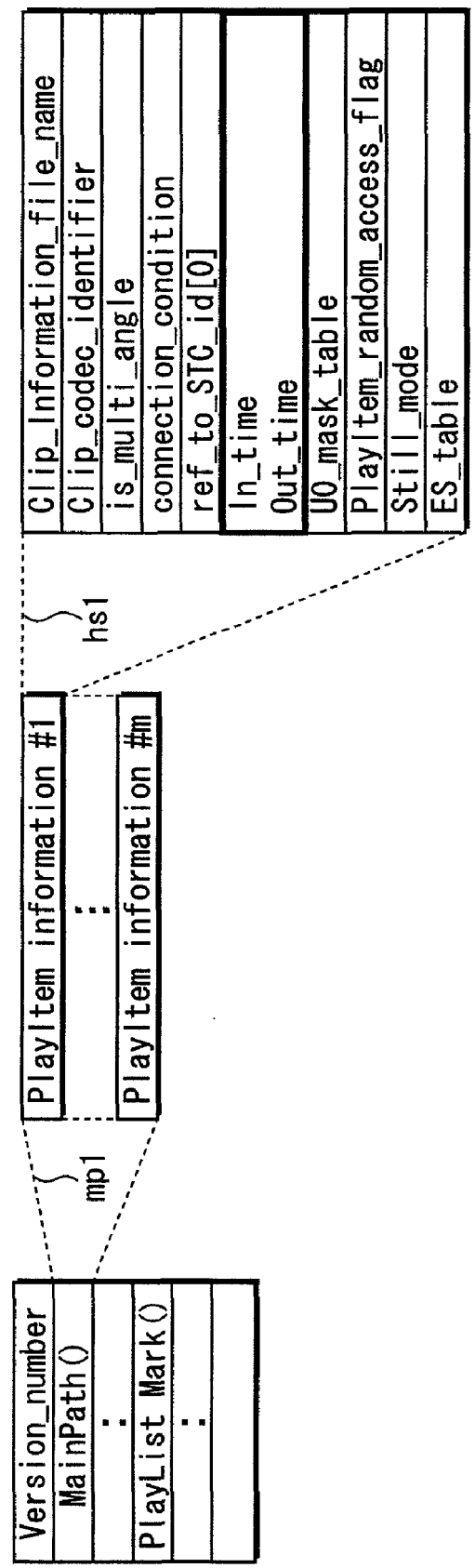
FIG. 4 shows a data structure of PlayList information.

FIG. 4 shows the data structure of the PlayList information. As shown in the figure, the PlayList information includes: Version_number that defines a version of the PlayList information, MainPath information (MainPath( )) that defines MainPath; and PlayListMark information (PlayListMark( )) that defines chapter.

The Version_number is set to a different number depending on whether the PlayList information supports NAC, that is to say, whether the PlayList information includes information on the NAC streams or not. The Version_number stored in the file (00001.mpls), that is, the Version_number of the PlayList information supporting NAC is set to, for example, "2.3". On the other hand, the Version_number stored in the file (00002.mpls), that is, the Version_number of the PlayList information not supporting NAC is set to, for example, "1.0" or "2.0".

The MainPath is a playback path that is defined with respect to the video stream as the main image and the audio stream.

As indicated by a lead line mp1, the MainPath is composed of a plurality of pieces of PlayItem information: PlayItem information #1 . . . PlayItem information #m. The PlayItem information defines one logical playback section that constitute the MainPath. The lead line hs1 in the drawing indicates the close-up of the structure of the PlayItem information. As indicated by the lead line hs1, the PlayItem information is composed of: "Clip_Information_file_name" that indicates the file name of the playback section information of the AVClip to which the IN point and the OUT point of the playback section belong; "Clip_codec_identifier" that indicates the AVClip encoding method; "is_multi_angle" that indicates whether or not the PlayItem is multi angle; "connection_condition" that indicates whether or not to seamlessly connect the current PlayItem and the preceding PlayItem; "ref_to_STC_id [0]" that indicates uniquely the STC_Sequence targeted by the PlayItem; "In_time" that is time information indicating the start point of the playback section; "Out_time" that is time information indicating the end point of the playback section; "UO_mask_table" that indicates which user operation should be masked by the PlayItem; "PlayItem_random_access_flag" that indicates whether or not to permit a random access to a mid-point in the PlayItem; "Still_mode" that indicates whether or not to continue a still display of the last picture after the playback of the PlayItem ends; and "ES_table". Among these, the time information "In_time" indicating the start point of the playback section and the time information "Out_time" indicating the end point of the playback section constitute a playback path. The presentation path information is composed of "In_time" and "Out_time".

1.3.1.1. Data Structure of "ES_table"

Details of the "ES_table" are described in the following.

The ES_table is a table that indicates playable (reproducible) streams among a plurality of elementary streams multiplexed in the AVClips specified by the Clip_Information_file_ name in the PlayItem information. More specifically, the ES_table is composed of associating the stream_attributes with the stream_entries respectively corresponding to playable elementary streams among the plurality of elementary streams multiplexed in the MainClips.

FIG. 5 shows the internal structure of the ES_table. Parentheses "{" indicate, for each type of streams (i.e., video streams, Primary audio streams, PG streams, and IG streams) pairs of stream_entry and stream_attributes corresponding to playable streams. An identifier (id) is attached to each stream to identify the stream among the same type of streams. The ES_table shown in FIG. 5 includes a pair of stream_entry and stream_attributes (stream_entry-stream_attributes) for the video stream, and a plurality of pairs of stream_entry and stream_attributes (stream_entry-stream_attributes) for the Primary audio streams, PG streams, and IG streams, respectively.

Also, the ES_table includes: number_of_video_stream_entries that indicates the number of playable video streams; number of_audio_stream_entries that indicates the number of playable-Primary audio streams; number_of_PG_stream_entries that indicates the number of playable PG streams; and number_of_IG_stream_entries that indicates the number of playable IG streams.

Next, details of the stream_entry-stream_attributes is described. FIG. 6A shows stream entry for a Primary audio stream. As shown in the figure, the stream_entry for the Primary audio stream includes "ref_to_Stream_PID_of_Main_Clip" that indicates the PID used for demultiplexing the Primary audio stream.

FIG. 6B shows stream_attributes corresponding to the Primary audio stream. The stream_attributes of the Primary audio stream includes: "coding_type" that indicates the encoding format of the audio stream; "presentation_type" that indicates the channel structure of the corresponding audio stream; "sampling_frequency" that indicates the sampling frequency of the corresponding audio stream; and "audio_language_code" that indicates the language attribute of the audio stream.

1.3.1.1.1. ES_table of File (00001.mpls)

Next, the ES_table of the file (00001.mpls) is described. In a case where the ES_table includes the stream_entry-stream_attributes of a NAC stream, it is important how the order of the stream_entry-stream_attributes of the playable audio streams is defined.

In the defined order in the ES_table, the stream_entry-stream_attributes of an audio stream which has been encoded, with use of an existing encoding format (AC3, DTS, LPCM, or the like), from the same audio source as that of the NAC stream needs to be immediately prior to the stream_entry-stream_attributes of the NAC stream. For example, in the case where the NAC stream is audio for Japanese voice-over for the primary video, it is preferable that the audio source of the audio stream immediately prior to the NAC be also audio for the Japanese voice-over for the primary video.

Also, it is preferable that the language code and the number of channels of the NAC stream be respectively the same as the language code and the channels of the conventionally encoded stream immediately prior to the NAC stream.

When selecting an audio stream to be played back in a case where there are a plurality of audio streams with the highest priority for selection, the playback apparatus selects the audio stream that is first in the order of entry (registration) of the plurality of audio streams in the ES_table. Accordingly, by performing registration as above, even if the existing playback apparatus erroneously judges itself as being capable of playing back the NAC stream, that is, the existing playback apparatus erroneously judges itself as satisfying the condition A, the conventionally encoded stream immediately prior to the NAC stream is selected, and the NAC stream is not selected.

Figure 7:
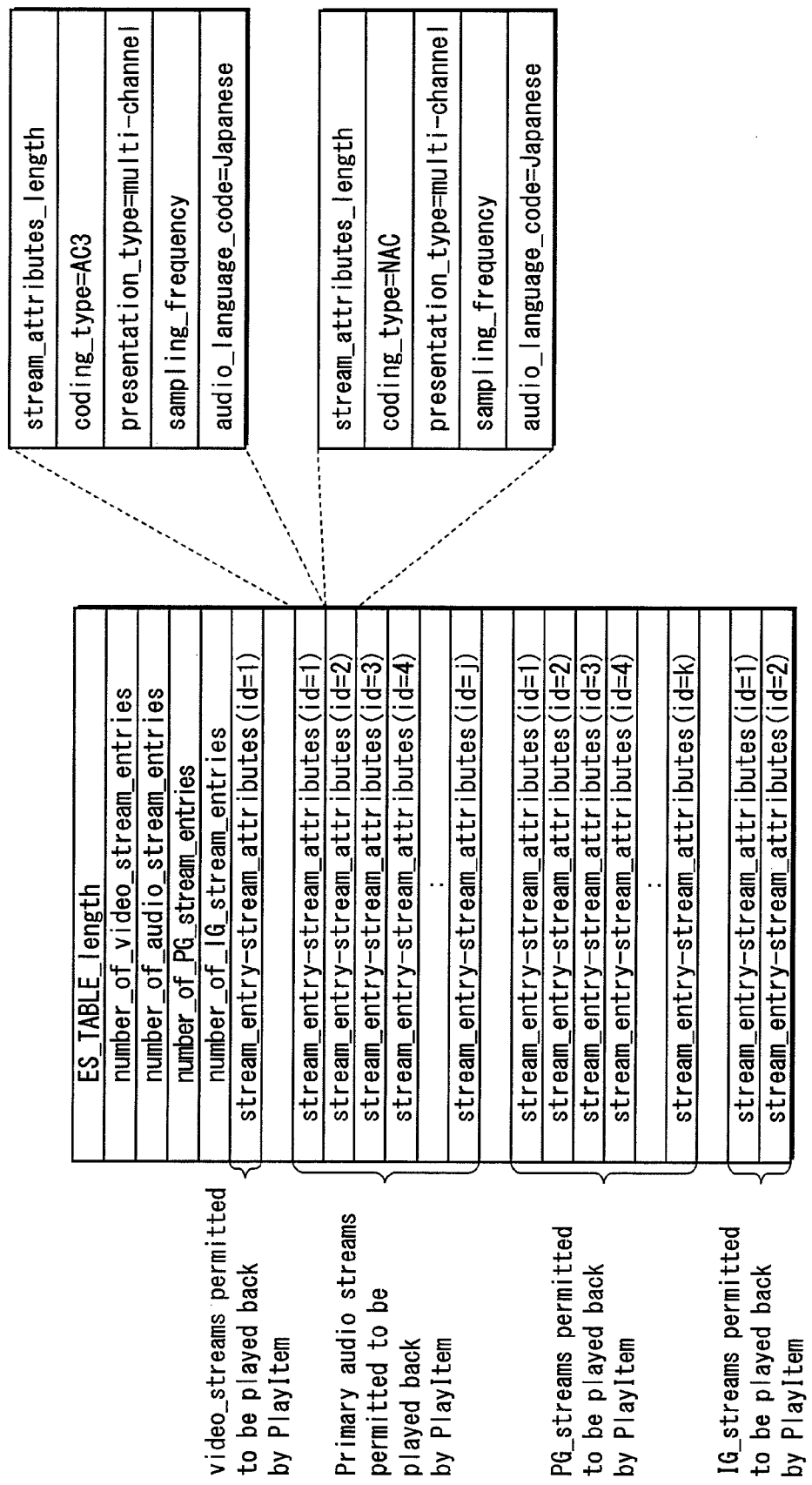
FIG. 7 shows an exemplary structure of ES_table that includes stream_entry-stream_attributes of an audio stream encoded using NAC.

FIG. 7 shows an exemplary structure of the ES_table that includes the stream_entry-stream_attributes of the NAC stream. As shown in FIG. 7, the first stream attributes (id=1) of the Primary audio stream describes AC3 as coding_type, multi-channel as presentation_type, and Japanese as audio_language_code. The stream_attributes (id=2) describes NAC as coding_type, multi-channel as presentation_type, and Japanese as audio_language_code. Also, it is assumed here that the audio stream (id=1) and the audio stream (id=2) have been encoded from the same audio content.

Even if the existing playback apparatus erroneously judges itself to be capable of playing back the NAC stream when selecting an audio stream to be played back, and the NAC stream and the audio stream encoded in AC3 are given the same priority as a result, the audio stream encoded in AC3 is selected, thereby guaranteeing playback of the audio stream by the existing playback apparatus.

1.4. CLIPINFO Directory

The CLIPINF directory includes a file to which an extension "clip" is attached. Each clip information file to which the extension "clip" is attached stores management information of an AVClip.

Here, as shown by FIG. 1, the CLIPINFO directory includes a file (00001.clip (with NAC)) and a file (00002.clip (without NAC)). The management information stored in the file (00001.clip (with NAC)) corresponds to the AVClip stored in the file (00001.m2ts (with NAC)) and includes information on the NAC stream. On the other hand, the management information stored in the file (00002.clip (without NAC)) corresponds to the AVClip stored in the file (00002.m2ts (without NAC)) and does not include information on the NAC stream.

Figure 8:
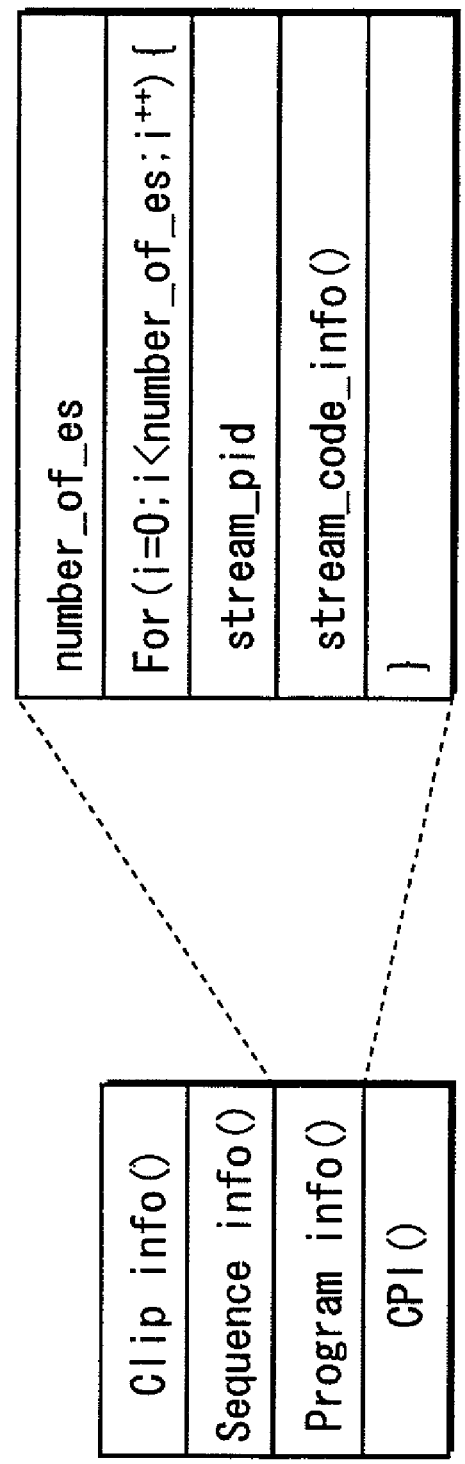
FIG. 8 shows an inner structure of management information of the AVClip.

FIG. 8 shows the internal structure of the management information of the AVClip. Basically, the management information of the AVClip corresponds to the AVClips on a one-to-one basis and includes: "ClipInfo( )" that stored information on the AVClip; "Sequence Info( )" that stores information on ATC Sequence and STC Sequence; "Program Info ( )" that stores information on Program Sequence; and "Characteristic Point Info(CPI( ))".

The Program Info includes: number_of_es indicating the number of elementary streams included in the AVClip; stream_pid each indicating the PID of each elementary stream; and stream_code_info( ) indicating attribute information in accordance with the type of the elementary stream.

Since the AVClip stored in the file (00001.m2ts) includes the audio stream encoded in NAC, the stream_code_info( ) of the management information stored in the file (00001.clip (with NAC) describes the attribute information of the audio stream that supports NAC.

The CPI( ) includes EP_map (not depicted) for each elementary stream that belongs to the AVClip. The EP_map is information that indicates, on an elementary stream, a packet number (SPN_EP_start) of the entry position where an Access Unit exists and an entry time (PTS_EP_start) in correspondence with each other.

The above-described PlayList information and Clip information are classified into "static scenario". This is because the Clip information and the PlayList information define a PlayList that is a static playback unit. This completes the description of the static scenario.

From now on, the "dynamic scenario" will be explained. The dynamic scenario is scenario data that dynamically defines the playback control of the AVClip. Here, "dynamically" indicates that the contents of the playback control change due to state change in the playback apparatus or due to a key event from the user. The BD-ROM presumes two modes as operation environments for the playback control. The first operation environment resembles that of the DVD playback apparatus, and is a command-based execution environment. The other is an operation environment of the Java™ virtual machine. The first operation environment is called the HDMV mode. The second operation environment is called the BD-J mode. Since these two operation environments are available, the dynamic scenario is written to conform to one of these operation environments. A dynamic scenario written to conform to the HDMV mode is called "Movie Object", and a dynamic scenario written to conform to the BD-J mode is called "BD-J Object".

First, the Movie Object will be described.

1.5. Movie Object

The Movie Object is stored in a file "MovieObject.bdmv" shown in FIG. 1 and includes a navigation command sequence.

The navigation command sequence is a sequence of commands that achieve a conditional branch, setting the status register in the playback apparatus, acquiring a value set in the status register, and so on. The following navigation commands can be written in the Movie Object.

PlayPL Command

Format: PlayPL (1$^{st}$ argument, 2$^{nd}$ argument)

As the 1$^{st}$ argument, a PlayList number is written to specify a PlayList to be played back. As the 2$^{nd}$ argument, a PlayItem included in the PlayList, given time in the PlayList, Chapter, or Mark is written to specify a playback start position.

A Play PL function using the PlayItem to specify a playback start position in the PL time axis is referred to as "PlayPLatPlayItem( )".

A PlayPL function using the Chapter to specify a playback start position in the PL time axis is referred to as "PlayPLatChapter( )".

A PlayPL function using the time information to specify a playback start position in the PL time axis is referred to as "PlayPLatSpecifiedTime( )".

The writing format of the navigation command in the Movie Object resembles the writing format of the navigation command in DVD. This makes it possible to efficiently transfer the disc contents from DVD to BD-ROM. The below-identified international publication, as a prior art, discloses the Movie Object. Please refer to the international publication WO 2004/074976 for detail of the Movie Object.

Up to now, the Movie Object has been described. The following describes BD-J Object.

1.6. BD-J Object

BD-J Object is a dynamic scenario of the BC-J mode that is written in the Java™ programming environment, and is stored in a file "00001.bobj". The BD-J Object differs from the Movie Object in that it does not contain a command directly written therein. That is to say, in the Movie Object, the control procedure is directly written in the navigation command. In contrast, in the BD-J Object, the control procedure is indirectly defined, with specifications for Java™ applications being written in the application management table. Such an indirect definition enables the sharing of the control procedure, in which a control procedure is shared by a plurality of dynamic scenarios, to be performed efficiently.

The playback of PlayList using Movie Object is achieved by writing a navigation command (PlayPL command) that instructs to reproduce a PlayList. The playback of PlayList using BD-J Object is achieved by incorporating the PlayList management table, which indicates PlayList playback procedures, into the BD-J Object.

Here, the Java™ applications in the BD-J mode will be described. It is presumed here that fully mounted in the Java™ platform in the BD-J mode are Java2 Micro_Edition (J2ME) Personal Basis Profile (PBP 1.0), and Globally Executable MHP specification (GEM1.0.2) for package media targets.

The Java™ applications in the BD-J mode are controlled by the Application Manager via the xlet interface. The xlet interface has four states: "loaded", "paused", "active", and "destroyed".

The above-described Java™ platform includes a standard Java™ library for displaying image data conforming to JFIF (JPEG), PNG, or the like. With this construction, the Java™ applications can achieve a GUI framework that is different from the GUI achieved by the IG stream in the HDMV mode. The GUI framework in the Java™ applications includes the HAVi framework defined in GEM1.0.2 and the remote control navigation mechanism in GEM1.0.2.

With such a construction, the Java™ applications can achieve a screen display in which a moving image is displayed on the screen together with buttons, texts, and online display (contents of BBS) based on the HAVi framework, and it is possible to perform operations on the displayed screen using remote control.

The substance of the Java™ applications is the Java™ archive file (00001.jar) stored in the BDJA directory under the BDMV directory shown in FIG. 1.

The International Publications, WO 2004/045840 A1, WO 2005/036555 A1, and WO 2005/036546 A1, as prior arts, disclose the BD-J Object. Please refer to these international publications for detail of the BD-J Object.

Up to now, the BD-J Object has been described.

2. Playback Apparatus 2.1. Hardware Structure

Figure 9:
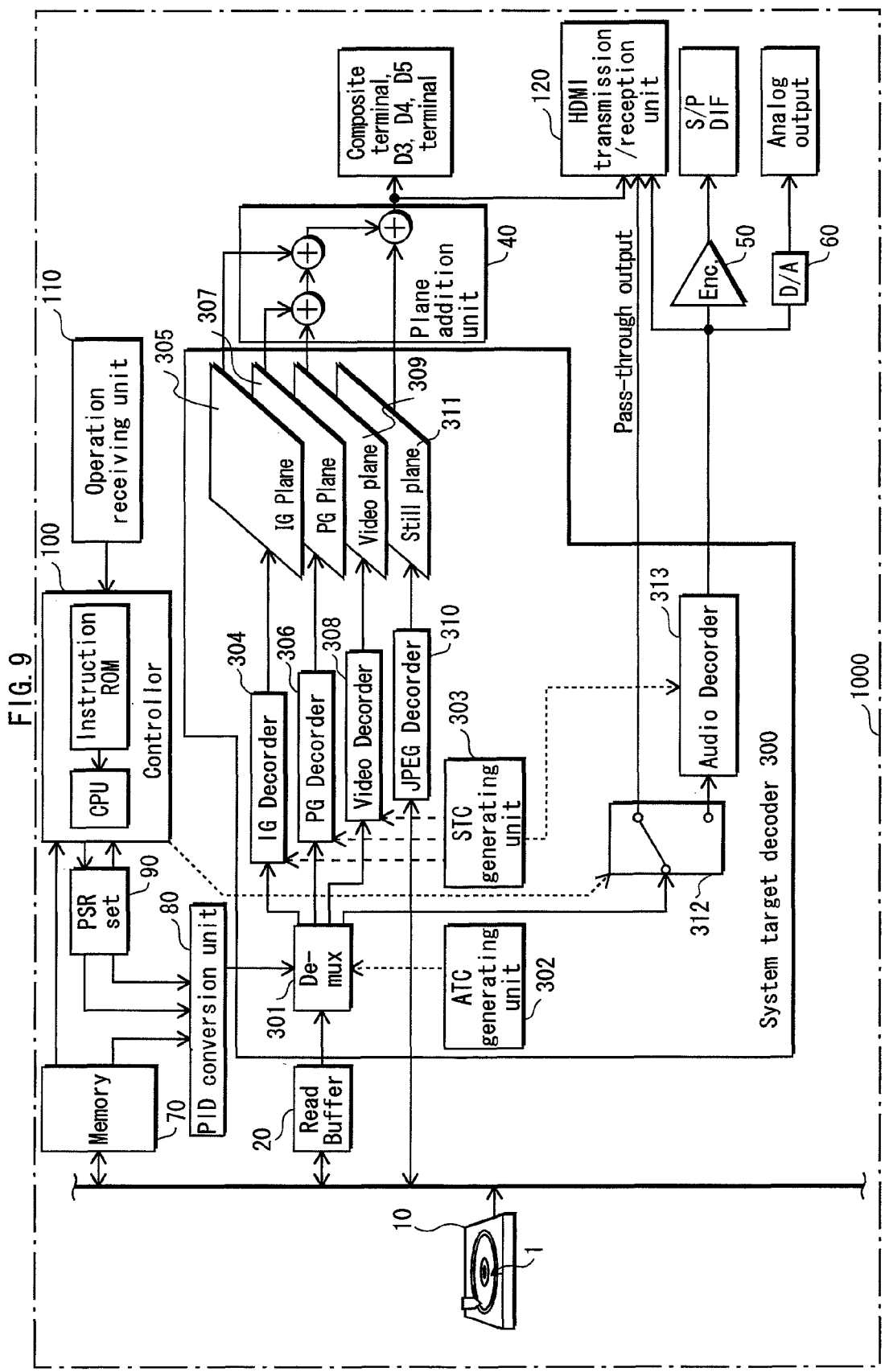
FIG. 9 shows an inner structure of a playback apparatus 1000.

FIG. 9 shows the internal structure of the playback apparatus 1000. The playback apparatus of the present invention is mainly composed of two parts: a system LSI; and a drive apparatus, and can be produced industrially by mounting these parts in the cabinet and on the substrate. The system LSI is an integrated circuit in which various processing units, which perform functions of the playback apparatus, are included. The playback apparatus produced in this way includes: a BD-ROM drive 10, a read buffer 20, a system target decoder 300, a plane addition unit 40, an encoder 50, a D/A converter 60, a memory 70, a PID conversion unit 80, a PSR set 90, a controller 100, a operation receiving unit 110, and an HDMI transmission/reception unit 120.

The BD-ROM drive 10 reads data from the BD-ROM 1 based on a read request input from the controller 100. The AVClip read from the BD-ROM 1 is transmitted to the read buffer 20, and the management information (the Index file, PlayList file, and Clip information file) and the MovieObject-.bdmv file and the BD-J Object file (hereinafter also referred to as "BD program files") are transmitted to the memory 70.

The read buffer 20 is a FIFO memory in which the TS packets read from the BD-ROM 1 are stored by the First-In-First-Out method.

The system target decoder 300 demultiplexes the TS packets stored in the read buffer 20 and decodes the streams. Information needed for decoding the streams included in the TS packets, such as codec type and stream attribute, is transmitted from the controller 100.

Specifically, the system target decoder 300 includes a demultiplexer 301, an ATC generating unit 302, an STC generating unit 303, an interactive graphics plane decoder (IG decoder) 304, an interactive graphics plane (IG plane) 305, a presentation graphics decoder (PG decoder) 306, a presentation graphics plane (PG plane) 307, a video decoder 308, a video plane 309, a JPEG decoder 310, a Still plane 311, a switch 312, and an audio decoder 313.

The demultiplexer 301 extracts the TS packets stored in the read buffer 20 and acquires PES packets from the extracted TS packets. The demultiplexer 301 then outputs, among the acquired PES packets, PES packets having the PIDs notified from the PID conversion unit 80 to one of the video decoder 308, the audio decoder 313, the IG decoder 304, and the PG decoder 306.

The ATC generating unit 302 generates Arrival Time Clock (ATC) in accordance with an instruction by the controller 100, and adjusts the operation timing of the demultiplexer 301.

The STC generating unit 303 generates System Time Clock (STC) in accordance with an instruction by the controller 100, and adjusts the operation timing of each decoder.

The IG decoder 304 decodes the interactive graphics stream input from the demultiplexer 301 and writes the non-compressed interactive graphics data to the IG plane 305 at the presentation time (PTS).

The IG plane 305 is a plane for storing graphics data.

The PG decoder 306 decodes the presentation graphics stream input from the demultiplexer 301 and writes the non-compressed presentation graphics data to the PG plane 307 at the presentation time (PTS).

The PG plane 307 is a plane for storing graphics data.

The video decoder 308 decodes PES packets output from the demultiplexer 301 to obtain non-compressed pictures, and writes the obtained picture to the video plane 309.

The video plane 309 is a plane for storing a non-compressed picture. The "plane" is a memory area in the playback apparatus for storing pixel data of one screen. The resolution of the video plane 5 is 1920×1080. The picture data stored in the video plane 309 is composed of a plurality of pieces of pixel data each of which is represented by a 16-bit YUV value.

The JPEG decoder 310 decodes graphics data (e.g., JPEG) data and writes the obtained data into the Still plane 311.

The Still plane 311 is a plane into which the non-compressed graphics obtained by decoding the JPEG data are written.

The switch 312 switches between (a) supplying, to the audio decoder 313, the TS packets of the Primary audio stream demultiplexed by the demultiplexer 301 and (b) not supplying to the audio decoders 313 but outputting the audio streams to other devices (pass-through output).

The audio decoder 313 decodes the PES packets input from the demultiplexer 301 and outputs the non-compressed audio data. The audio decoder 313 is able to decode the NAC stream.

The plane addition unit 40 generates a video signal by superimposing the video plane 309, the PG plane 307, the IG plane 305, and the Still plane 311 instantaneously, and outputs the generated image signal to a display such as a digital TV.

The encoder 50, when the audio data in the LPCM state, which is obtained as a result of decoding by the audio decoder 313, is sent as a surround sound/voice via a digital interface such as S/PDIF, encodes and compresses the LPCM into the Dolby Digital (DD) format or the Dolby Theater System (DTS) format.

The D/A converter 60 converts the audio data in the LPCM state, which is obtained as the result of decoding by the audio decoder 313, to analog data and outputs the converted data to an external device.

The memory 70 is a memory for storing current PL information, current Clip information and the like, in addition to the BD program files. The current PL information is PlayList information that is currently processed, among a plurality of pieces of PlayList information stored in the BD-ROM. The current Clip information is Clip information that is currently processed, among a plurality of pieces of Clip information stored in the BD-ROM.

The PID conversion unit 80 converts the stream number of the Primary audio streams stored in the PSR set 90 into PIDs based on the ES_table, and notifies the PIDs as the conversion results to the demultiplexer 301.

The PSR set 90 is a register embedded in the playback apparatus, and is composed of the 64 number of Player Setting/Status Registers (PSR) and the 4096 number of General Purpose Registers (GPR). Among the values (PSR) set in the Player Setting/Status Registers, PSR4 to PSR8 are used to represent the current playback point.

The controller 100 includes a CPU 100a and an instruction ROM 100b.

The CPU 100a achieves a playback control of the BD-ROM by decoding a Movie Object and a Java™ application referred to by a BD-J Object stored in the MovieObject.bdmv, and performing a PlayList playback in accordance with the decoding result (that is to say, a playback control in accordance with the current PL information). The CPU 100a also performs the above-mentioned ATS control and STC control.

The instruction ROM 100b stores software defining the control of the playback apparatus.

The operation receiving unit 110 receives specification of an operation from a user, and notifies user event information, which indicates the operation specified by the user, to the controller 100.

The HDMI transmission/reception unit 120 receives, from an apparatus connected via HDMI (High Definition Multimedia Interface), information concerning the apparatus. Also, the HDMI transmission/reception unit 120 transmits the digital non-compressed video, which is obtained as a result of decoding by the video decoder 308, to the apparatus via HDMI, together with LPCM audio data or compressed audio data.

Up to now, the hardware construction of the playback apparatus 100 has been explained. From now on, the software construction of the playback apparatus 100.

2.2. Software Structure

Figure 10:
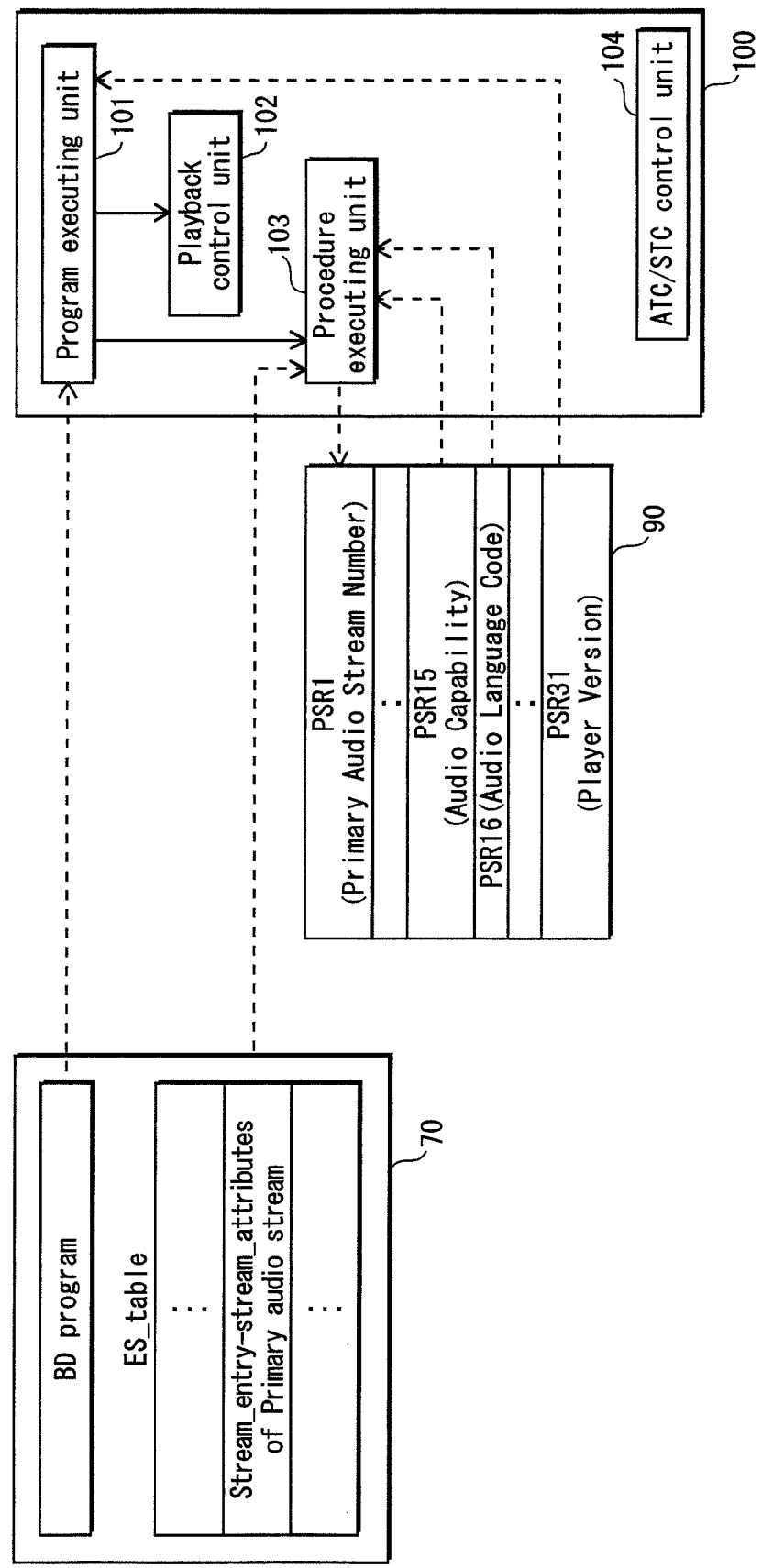
FIG. 10 shows functions of a controller 100.

FIG. 10 shows the functions of the controller 100. As shown in FIG. 10, the controller 100 includes a program executing unit 101, a playback control unit 102, a Procedure executing unit 103, and an ATC/STC control unit 104 that causes the ATC generating unit 302 and the STC generating unit 303 to generate ATC and STC, respectively.

These components perform the processes based on the PSR set 90. The following explains PSR1, PSR15, and PSR31.

<PSR1>

FIG. 11A shows the bit assignment in the PSR1.

As shown in FIG. 11A, the lower eight bits (b0-b7) among 32 bits of the PSR1 represent a stream number, and identifies one of a plurality of Primary audio streams whose entries are written in the ES table of the current Play Item. When the value set in the PSR1 changes, the playback apparatus 1000 plays back a Primary audio stream corresponding to the set value after the change. The PSR1 is set to "0×FF" as the initial value, and then may be set to a value ranging from "1" to "32" by the playback apparatus 1000. The value "0×FF" is an unspecified value and indicates that there is no Primary audio stream or that a Primary audio stream has not been selected. When the PSR1 is set to a value ranging from "1" to "32", the set value is interpreted as a stream number of a Primary audio stream.

<PSR15>

FIG. 11B shows the bit assignment in the PSR15.

As shown in FIG. 11B, the PSR 15 includes DRA capability, Dolby Lossless capability, DTS-HD capability, Dolby Digital Plus capability, and LPCM capability.

The DRA capability includes DRA Extension and DRA Core. The DRA Extension and the DRA Core each, when set to 01b, indicate that the playback apparatus is capable of playing back stereo audio in the DRA format, and when set to 10b, indicate that the playback apparatus is capable of playing back a surround audio in the DRA format. When set to 00b, the DRA Extension and the DRA Core each indicate that the playback apparatus is not capable of decoding audio streams in the DRA format.

<PSR31>

FIG. 11C shows the bit assignment in the PSR31.

As shown in FIG. 11C, the lower 16 bits (b0-b15) among 32 bits of the PSR31 represent Player Version information. When the lower 16 bits are "0000 0010 0000 0000b", they indicate that the version of the playback apparatus is 2.0, 2.1, or 2.2. When the lower 16 bits are "0000 0010 0011 0000b", they indicate that the version of the playback apparatus is 2.3.

Up to now, the PSR set 90 has been described.

From now on, the program executing unit 101, the playback control unit 102, and the Procedure executing unit 103 will be described.

<Program Executing Unit 101>

The program executing unit 101 executes programs stored in the BD program file stored in the memory 70. Specifically, the program executing unit 101, based on the user event input from the operation receiving unit 110, instructs the playback control unit 102 to playback a PlayList or instructs the Procedure executing unit 103 to acquire/set the status of the PSR set 90.

Figure 12:
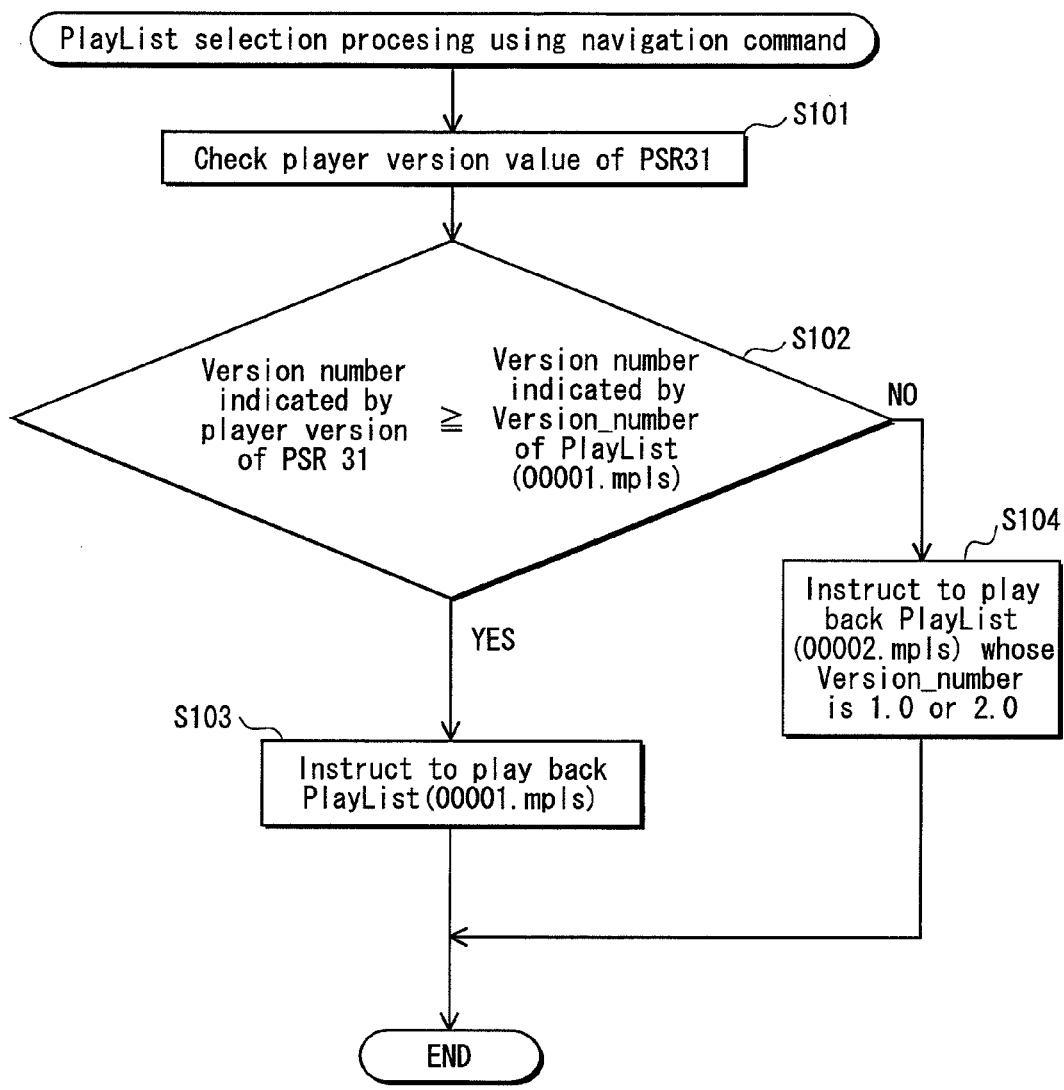
FIG. 12 is a flowchart showing PlayList selection processing in a case where navigation commands stored in a BD program file include a navigation command that plays back a PlayList whose version_number is 2.3 or higher.

FIG. 12 is a flowchart showing PlayList selection processing in a case where the navigation commands stored in the BD program file include a navigation command which plays back a PlayList whose version_number is 2.3 or higher.

First, the BD program checks the player version value of the PSR 31 (step S101) and judges whether the playback apparatus supports NAC or not. More specifically, the BD program judges whether or not the version number indicated by the player version of the PSR 31 is not lower than the version number indicated by the Version_number of the PlayList (00001.mpls) (step S102).

If the version number indicated by the player version of the PSR 31 is not lower than the version number indicated by the Version_number of the PlayList (00001.mpls) (Yes at step S102), the BD program instructs the playback control unit 102 to play back the PlayList (00001.mpls).

If the version number indicated by the player version of the PSR 31 is lower than the version number indicated by the Version_number of the PlayList (00001.mpls) (No at step S102), the BD program instructs the playback control unit 102 to play back the PlayList (00002.mpls) having the Version_number of 1.0 or 2.0.

Similarly, as is the case with the PlayList, switching is made between the Clip information supporting NAC and the clip information not supporting NAC, depending on the playback capability of the playback apparatus.

<Playback Control Unit 102>

The playback control unit 102 controls playback of an AVClip by controlling the BD-ROM drive 10 and the system target decoder 300. For example, the playback control unit 102 refers to the PlayList information stored in the memory 70 based on a playback instruction input from the program executing unit 101 to control playback processing of an AVClip.

Figure 13:
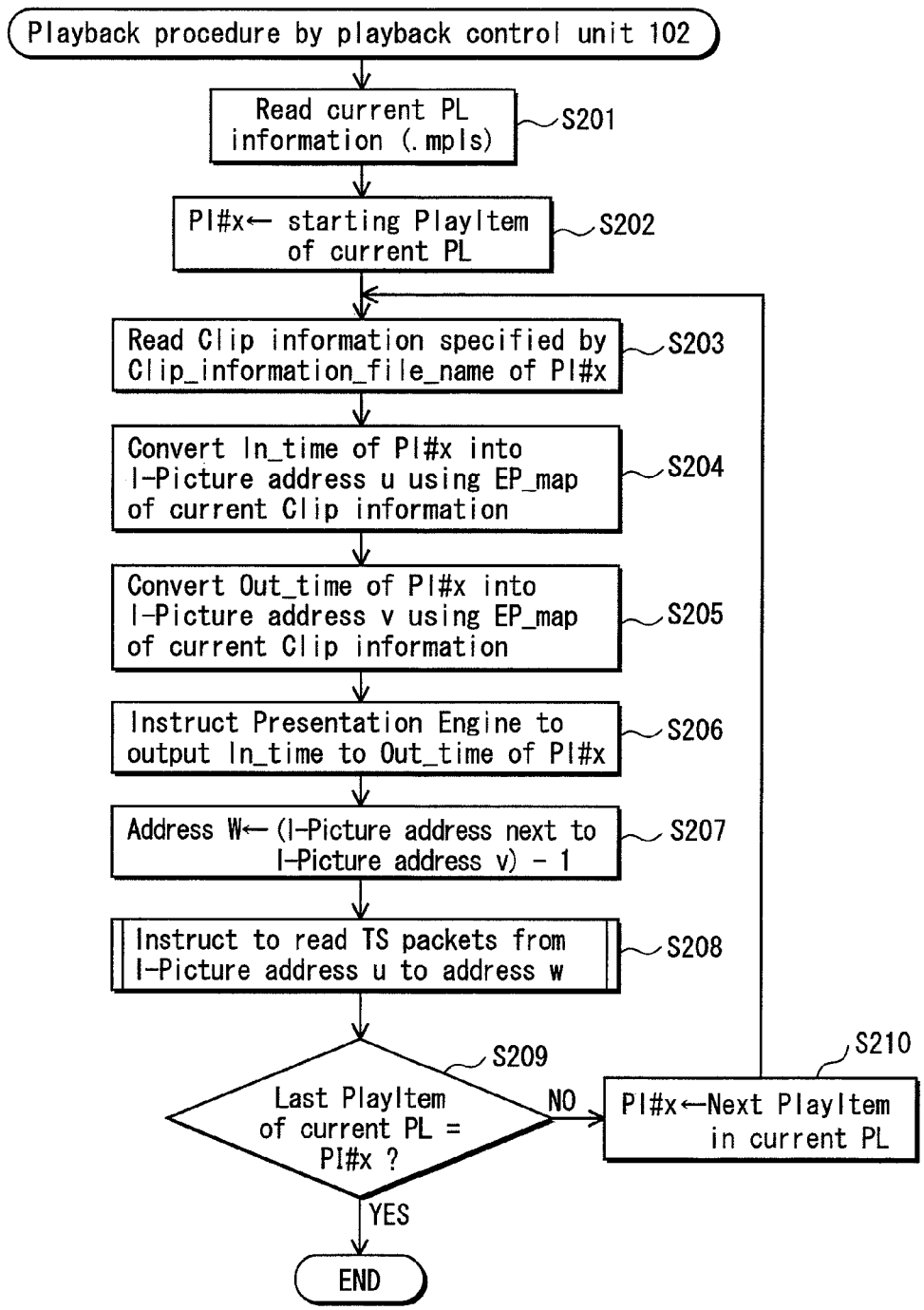
FIG. 13 is a flowchart showing a PlayList playback procedure by a playback control unit 102.

FIG. 13 is a flowchart showing the PlayList playback procedure by the playback control unit 102.

In this flowchart, first the current PL information (.mpls) is readout (step S201), and then steps S202 to S210 are performed. The steps S202 to S210 constitute a loop in which steps S203 to S210 are repeatedly performed for each piece of PI information that constitutes the current PL information until it is judged as Yes in step S209. In this loop process, the process-target PlayItem is referred to as PlayItem#x (PI#x). The PlayItem#x is initialized by being set to the starting PlayItem of the current PL information (step S202). The condition for ending the loop is that the PlayItem#x is the last PlayItem of the current PL information (step S209). If it is judged in step S209 that PlayItem#x is not the last PlayItem of the current PL information, PlayItem#x is set to the next PlayItem in the current PL information (step S210).

In the steps S203 to S210 that are repeatedly performed in the loop process, Clip information specified by Clip_information_file_name of PlayItem#x is read out onto the memory (step S203), In_time of PlayItem#x is converted into I-Picture address u using EP_map of the current Clip information (step S204), Out_time of PlayItem#x is converted into I-Picture address v using EP_map of the current Clip information (step S205), I-Picture address next to I-Picture address v is obtained, and an address that precedes the obtained address by one is set to address w (step S207), and the BD-ROM drive 1 or the local storage 200 is instructed to read TS packets from I-Picture address u to address w (step S208).

On the other hand, a video decoder or the like is instructed to output from mark time stamp of current PLMark to Out_time of PlayItem#x (step S206). In the steps S205 to S208, a portion of AVClip specified by PlayItem#x is reproduced.

After this, it is judged whether or not the PlayItem#x is the last PlayItem of the current PL information (step S209).

If it is judged in step S209 that PlayItem#x is not the last PlayItem of the current PL information, PlayItem#x is set to the next PlayItem in the current PL information (step S210), and the control returns to step S203. As the above-described steps S203 to S210 are repeated, each piece of PI information that constitutes the current PL information is reproduced in sequence.

<Procedure Executing Unit 103>

The Procedure executing unit 103, when necessity for changing a piece of PlayItem information to another arises, or when the user instructed, through an operation, to change the stream number, executes a predetermined stream selection procedure, and writes a new stream number into PSR1. The playback apparatus 1000 plays back the Primary audio stream according to the stream number written in PSR1. The setting of PSR1 thus enables a Primary audio stream to be selected.

The reason why the stream selection procedure is executed when the PlayItem information is changed is as follows. Since the ES_table is provided in correspondence with each piece of PlayItem information, it may happen that a Primary audio stream, which is playable according to a piece of PlayItem information, cannot be reproduced according to another piece of PlayItem information.

Figure 14A:
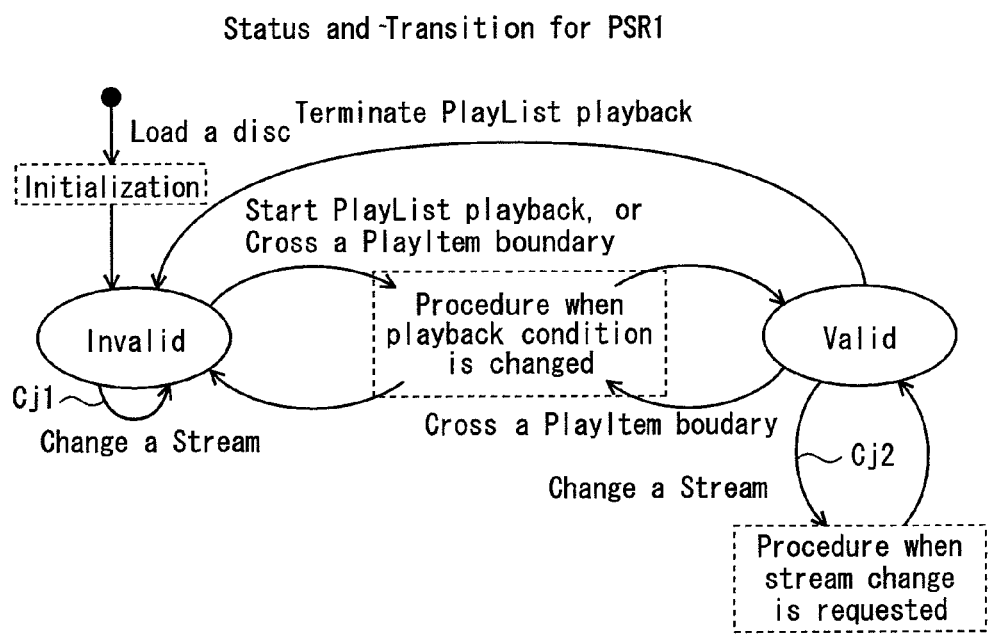
FIG. 14A shows status transition of a value set in PSR1.

The Procedure executing unit 103 brings PSR1 to change in status as shown in FIG. 14A. FIG. 14A shows the status transition of the value set in PSR1. It should be noted here that in FIG. 14A, the term "valid" means that the value of PSR1 is equal to or smaller than the number of stream entries written in the ES_table of the Play Item, and is decodable.

The term "invalid" means that (a) the value of PSR1 is "0", (b) the value of PSR1 is larger than the number of stream_entries written in the ES_table of the Play Item, or (c) decoding is not available even if the number of stream_entries written in the ES_table of the Play Item is in the range from "1" to "32".

The frames drawn with dotted lines in FIG. 14A indicate a procedure for determining the value of PSR when the status changes. The procedure for setting a value to PSR is classified into "Procedure when playback condition is changed" and "Procedure when Stream change is requested".

The "Procedure when playback condition is changed" is a procedure to be executed when the playback apparatus has changed in the status due to some event that occurred to the apparatus.

The "Procedure when Stream change is requested" is a procedure to be executed when the user requests some changing (in FIG. 14A, "Change a Stream").

The "Procedure when playback condition is changed" and "Procedure when Stream change is requested" are stream selection procedures and will be described in detail with reference to the flowcharts.

The arrows in FIG. 14A symbolically indicate the status transition of PSR.

The notes attached to the arrows indicate events that trigger each status transition. That is to say, FIG. 14A indicates that a status transition of PSR1 occurs if an event such as "Load Disc", "Change a Stream", "Start PlayList playback", "Cross a PlayItem boundary", or "Terminate PlayList playback" occurs. It will be understood by referring to FIG. 14A that the above-mentioned procedures are not performed when a status transition of "Invalid→Invalid" or "Valid→Invalid" occurs. On the other hand, status transitions of "Invalid→Valid" and "Valid→Valid" go through the dotted-line frames. That is to say, the above-mentioned "Procedure when playback condition is changed" or "Procedure when Stream change is requested" is performed when PSR1 is set to be "Valid".

The following describes the events that trigger the status transition.

The event "Load Disc" indicates that the BD-ROM has been loaded in the playback apparatus. In such loading, PSR1 is once set to an unspecified value (0×FF). The event "Start PlayList playback" indicates that a playback process based on PlayList has been started. When such an event occurs, the "Procedure when playback condition is changed" is executed, and PSR1 is set to be "Valid".

The event "Terminate PlayList playback" indicates that a playback process based on PlayList has been terminated. It is understood that when such an event occurs, the "Procedure when playback condition is changed" is not executed, and PSR1 is set to be "Invalid".

The event "ChangeXXX" indicates that the user requested to change XXX (in FIG. 14A, Stream). If this event occurs when PSR1 is "Invalid" (indicated by "cj1" in FIG. 14A), PSR1 is set to a value as requested. Even if the value that is set in this way indicates a valid stream number, the value set in PSR1 is treated as an "Invalid" value. That is to say, in the status transition triggered by the event "ChangeXXX", PSR never changes from Invalid to Valid.

On the other hand, if event "Change a Stream" occurs when PSR1 is "Valid" (indicated by "cj2" in FIG. 14A), the "Procedure when Stream change is requested" is executed, and PSR1 is set to a new value. Here, the value set when the "Procedure when Stream change is requested" is executed may not be a value desired by the user. This is because the "Procedure when Stream change is requested" has a function to exclude an invalid value. If the event "Change stream" occurs when PSR1 is "Valid", PSR1 never changes from Valid to Invalid. This is because the "Procedure when Stream change is requested" assures that PSR1 does not become "Invalid".

The event "Cross a PlayItem boundary" indicates that a Play Item boundary has been passed. Here, the Play Item boundary is a boundary between two successive Play Items, namely a position between the end of a preceding Play Item and the start of a succeeding Play Item, among the two successive Play Items. If the event "Cross a PlayItem boundary" occurs when PSR1 is "Valid", the "Procedure when playback condition is changed" is executed. After the execution of the "Procedure when playback condition is changed", the status of PSR1 either returns to "Valid" or transits to "Invalid". Since the ES_table is provided in correspondence with each Play Item, if a Play Item changes, a playable elementary stream also changes. The status transition is aimed to set PSR1 to a most appropriate value for each Play Item by executing the "Procedure when playback condition is changed" each time a Play Item starts to be reproduced.

Figure 14B:
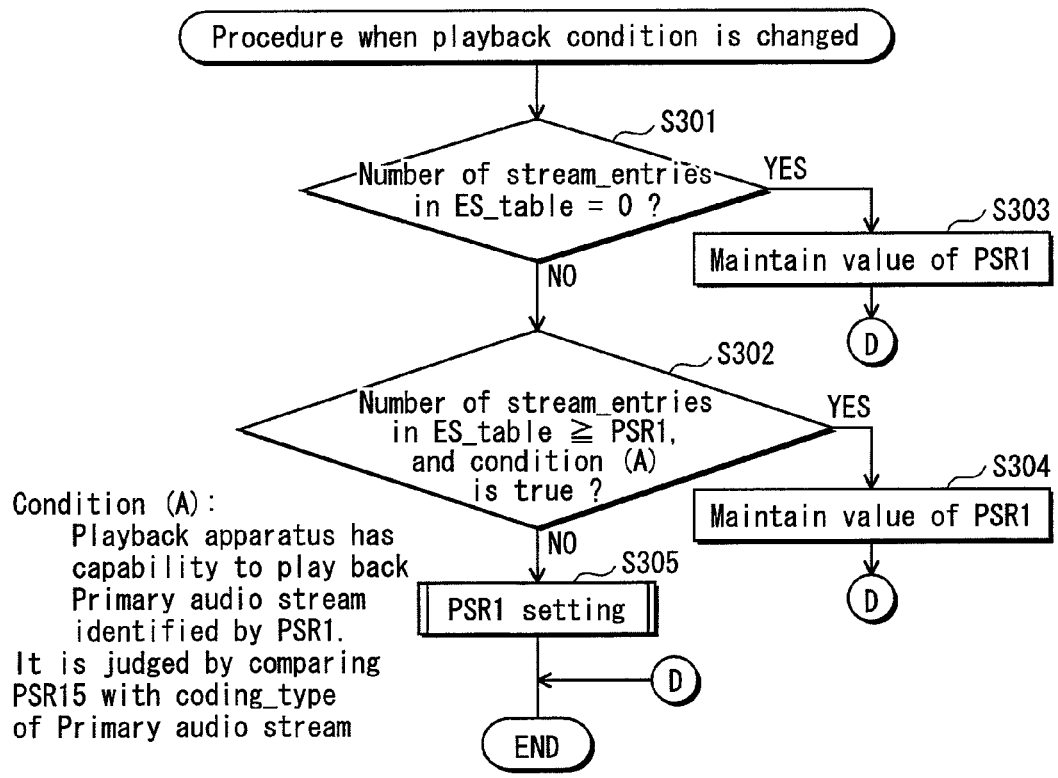
FIG. 14B is a flowchart of "Procedure when playback condition is changed"

In the above-described status transition, the "Procedure when playback condition is changed" is executed as shown in FIG. 14B. FIG. 14B is a flowchart of the "Procedure when playback condition is changed". The procedure sets a value in PSR1 by performing two judgment steps, S301 and S302.

In step S301, it is judged whether the number of stream_entries in ES_table is "0". If it is judged that the number of stream_entries in ES_table is "0", the value of PSR1 is maintained (step S330).

In step S302, which is executed if it is judged in step S301 that the number of stream_entries in ES_table is not "0", it is judged whether the number of stream_entries in ES_table is equal to or larger than PSR1, and condition (A) is true. Here, the condition (A) is that the playback apparatus has capability to reproduce a Primary audio stream identified by PSR1. If the judgment result of step S302 is positive, the value of PSR1 is maintained (step S304).

If either the value of PSR1 is larger than the number of stream_entries in ES_table or the condition (A) is not satisfied, a process is performed to set PSR1 (step S305).

FIG. 15 is a flowchart showing the detailed procedure of step S305. In this flowchart, steps S401 and S402 constitute a loop in which step S403 is repeatedly performed for all Primary audio streams. In this loop, the process-target Primary audio stream is referred to as Primary audio stream i. In step S404, it is checked whether Primary audio stream i satisfies conditions (a), (b), and (c).

The condition (a) is that the playback apparatus has capability to reproduce Primary audio stream i, and whether the condition is satisfied is judged by comparing PSR15 with coding_type of Primary audio stream i.

The condition (b) is that the language attribute of Primary audio stream i is the same as the language setting in the playback apparatus, and whether the condition is satisfied is judged by checking whether audio_language_code of Primary audio stream written in ES_table is equal to the value set in PSR 16.

The condition (c) is that the channel attribute of Primary audio stream i is surround, and the playback apparatus has capability to reproduce it, and whether the condition is satisfied is judged by comparing PSR15 with presentation_type and coding_type of Primary audio stream i.

Based on the pattern of (i) which conditions, among the plurality of conditions, are satisfied by Primary audio stream and (ii) how many conditions are satisfied, this flowchart assigns priorities to the Primary audio streams.

After the process is repeatedly performed for all Primary audio streams, steps S404 to S408 are performed. In step S404, it is judged whether it is true that no Primary audio stream satisfies condition (a). If it is judged that it is true, an unspecified value (0×FF) is set to PSR1 (step S409).

In step S405, it is judged whether there are Primary audio streams that satisfy all of conditions (a), (b), and (c). If it is judged positively (Yes at step S405), the stream numbers of such Primary audio streams that satisfy all of conditions (a), (b), and (c) are set in PSR1 (step S410).

Here, if there are a plurality of Primary audio streams that satisfy all of conditions (a), (b), and (c), it is necessary to determine one among them that is set in PSR1. In step S410, it is determined based on the order of the stream_entries in the ES_table. That is to say, in step S410, if there are a plurality of Primary audio streams that are the same in the codec, language attribute, and channel attribute, the ES_table is referred to and a Primary audio stream that is the first in the order of the stream_entries in the ES_table is selected.

It is therefore possible for the person in charge of authoring to control the priority levels of streams to be reproduced, by changing the order of the stream_entries in the ES_table.

If there is no Primary audio stream that satisfies all of conditions (a), (b), and (c), the control goes to step S406 in which it is judged whether there are Primary audio streams that satisfy conditions (a) and (b). If it is judged that there are Primary audio streams that satisfy conditions (a) and (b) (Yes at step 406), a Primary audio stream among these that is the first in the order of the stream entries in the ES_table is set in PSR1 (step S411).

If there is no Primary audio stream that satisfies all of conditions (a), (b), and (c) and there is no Primary audio stream that satisfies conditions (a) and (b), the control goes to step S407 in which it is judged whether there are Primary audio streams that satisfy conditions (a) and (c). If it is judged that there are Primary audio streams that satisfy conditions (a) and (c) (Yes at step S407), a Primary audio stream among these that is the first in the order of the stream_entries in the ES_table is set in PSR1 (step S412).

If there is no Primary audio stream that satisfies all of conditions (a), (b), and (c), there is no Primary audio stream that satisfies conditions (a) and (b), and there is no Primary audio stream that satisfies conditions (a) and (c), the control goes to step S408 in which it is judged whether there are Primary audio streams that satisfy condition (a). If it is judged that there are Primary audio streams that satisfy condition (a) (Yes at step S408), a Primary audio stream among these that is the first in the order of the stream_entries in the ES_table is set in PSR1 (step S413).

Figure 16:
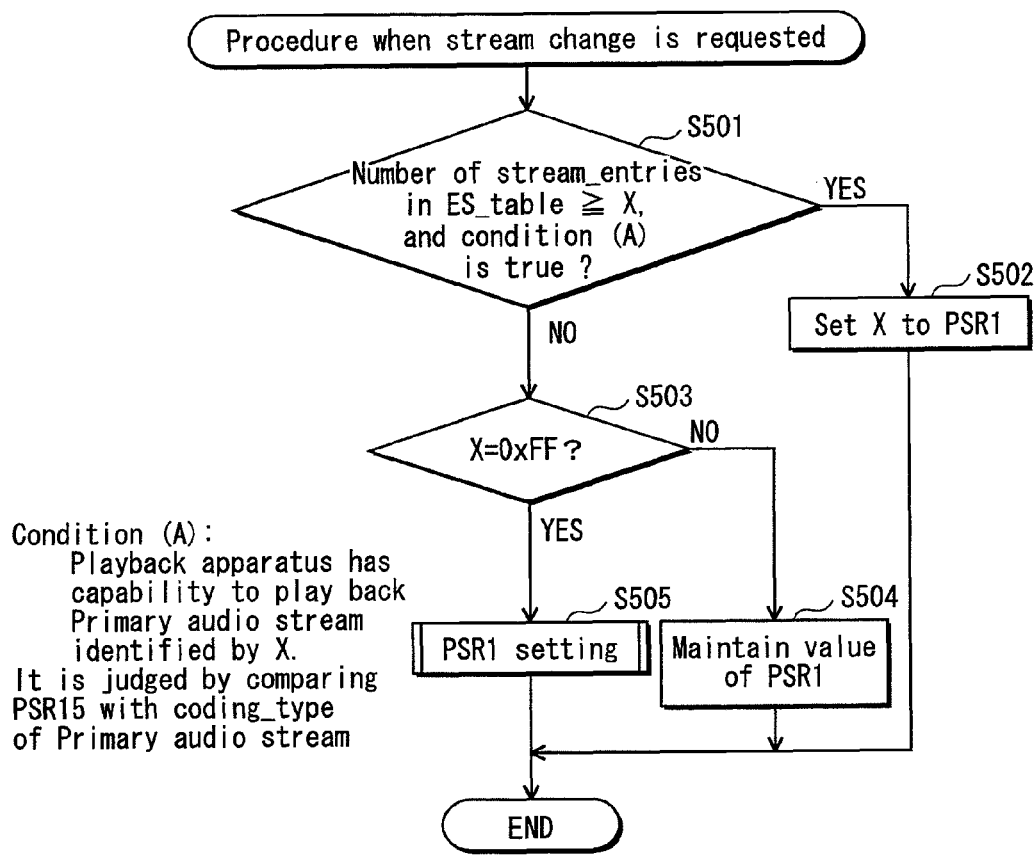
FIG. 16 is a flowchart showing a procedure for setting PSR1 when stream change is requested.

Up to now, the "Procedure when playback condition is changed" has been explained. From now on, the "Procedure when Stream change is requested" will be explained. FIG. 16 is a flowchart showing the procedure for setting PSR1 when stream change is requested. The flowchart of FIG. 16 differs from the flowchart of FIG. 14B in that in some places X is used in place of PSR1. The "X" is a value determined based on the user event information output from the operation receiving unit 110 or a button command output from the IG decoder 304.

In step S501 of the flowchart, it is judged whether the number of stream_entries in ES_table is equal to or larger than X, and condition (A) is true. Here, the condition (A) is that the playback apparatus has capability to reproduce a Primary audio stream identified by PSR1. It is judged by comparing PSR15 with coding_type of the Primary audio stream. If the judgment result of step S501 is positive, X is set to PSR1 (step S502).

If either X is larger than the number of stream_entries in ES_table or the condition (A) is not satisfied (No at step S502), it is judged whether X is 0×FF (step S503).

Here, if X is not 0×FF (No at step S503), it is considered that the number of the Primary audio stream that the user intends to select is invalid, and the value X, which is determined based on the user operation, is disregarded and the value set in PSR1 is maintained (step S504).

If X is 0×FF (Yes at step S503), PSR1 is set (step S505). The processing procedure of step S505 is the same as the procedure shown in FIG. 15 (Among the steps shown in FIG. 15, the judgment in step S404 is not required in the "Procedure when Stream change is requested". This is because in the "Procedure when Stream change is requested", if there is no Primary audio stream that satisfies conditions (a), (b), and (c), X, which is set by the user, is not set to PSR1, and the value set in PSR1 is maintained).

<How an Audio Stream Supporting to NAC is Selected>

Next, a method for selecting an audio stream that supports NAC will be described. The BD-J application defined by a JAR file (00001.jar) is a program to be executed when PlayList is played back. The BD-J application causes the playback apparatus to display a menu for receiving, from a user, an operation to select the NAC stream, and causes the playback apparatus to execute a NAC audio stream setting function. When a selective operation is made on the menu by a user, the NAC audio stream setting function sets PSR1 to the stream number of the NAC stream.

Figure 17:
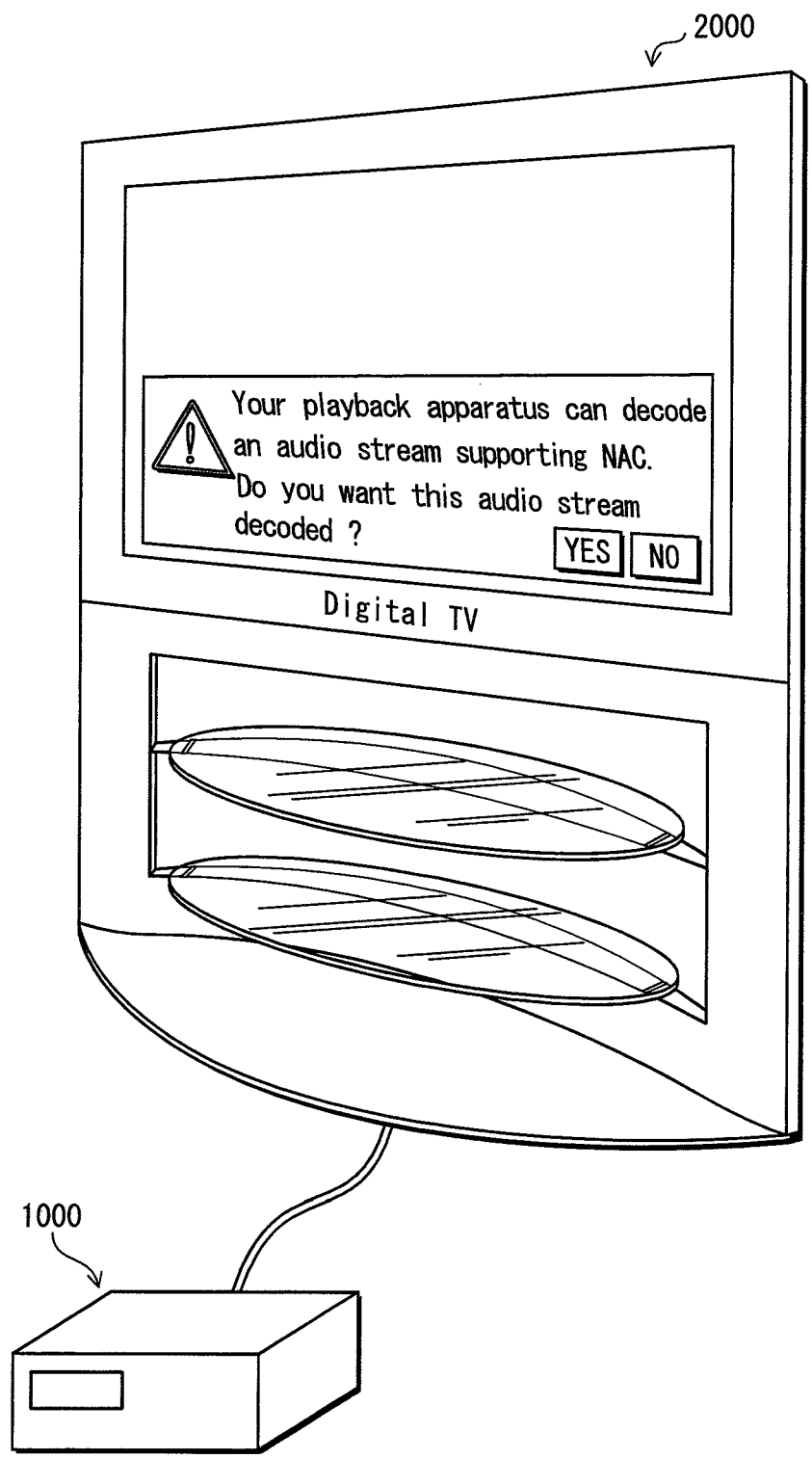
FIG. 17 shows an example of a menu screen.

FIG. 17 shows an example of a menu screen. If an operation to select the NAC stream is received from a user, that is, when "YES" button is selected, PSR1 is set to the stream number of the NAC stream.

It should be noted that incorporating a NAC audio stream setting command, which is equivalent to the NAC audio stream setting function, into button information as a navigation command of the button information enables the playback apparatus to execute the NAC audio stream setting command in accordance with an operation to confirm on the NAC audio stream setting button drawn by the Interactive Graphics stream. Accordingly, the NAC audio stream setting function can be realized in the HDMV mode as well.

3. Specific Example of Audio Stream Selection by Existing Playback Apparatus

The following describes how an existing playback apparatus that does not support NAC selects an audio stream to be played back from among the plurality of audio streams including the NAC stream stored in the BD-ROM, using a specific example. It should be noted that this playback apparatus is assumed to erroneously judge itself to be capable of decoding the NAC stream.

FIG. 18A shows Player Capability, language setting, and Surround Capability of the playback apparatus. As shown by FIG. 18A, it is assumed that the existing playback apparatus is capable of decoding LPCM and outputting AC-3 surround audio, is not capable of decoding the NAC stream; and is set with its language setting to indicate a Japanese audio.

Assume that the BD-ROM having recorded the ES_table shown in FIG. 18B is loaded into the above-described playback apparatus. This ES_table describes stream_entry-stream_attributes of six audio streams as shown by FIG. 18C.

First, based on the ES_table shown in FIG. 18B, the playback apparatus checks whether each audio stream satisfies the conditions (a), (b), and (c). Here, Audio Stream 1 satisfies only the condition (a) among the three conditions. Audio stream 2 satisfies the conditions (a) and (c) among the three conditions. Satisfying only the condition (c) and not satisfying the condition (a), Audio stream 3 is not to be a selection target normally. However, because the existing playback apparatus is assumed to erroneously judge itself to be capable of decoding the NAC stream, the Audio stream 3 is judged to satisfy the conditions (a) and (c), and the Audio stream 3 is also a selection target. Audio stream 4 satisfies the conditions (a) and (b). Audio stream 5 satisfies the conditions (a), (b), and (c). Audio stream 6 satisfies the condition (b) and (c). Furthermore, as described above, since the existing playback apparatus is assumed to erroneously judge itself to be capable of decoding the NAC stream, the Audio stream 6 is judged to satisfy the conditions (a), (b), and (c).

Now the conditions satisfied by the audio streams are clear, and the fifth and the sixth audio streams which satisfy all of the conditions (a), (b), and (c) are given the highest priority. When there are a plurality of audio streams with the highest priority, the audio stream that is the first in the order of the stream_entries in the ES_table is selected. Accordingly, the Audio stream 5 is selected here.

As is apparent from the above, even if an existing playback apparatus erroneously judges itself to be capable of decoding the NAC stream, the NAC audio stream is not selected.

As described above, according to the present embodiment, (a) Clip information and AV data that support NAC and (b) Clip information and AV data that do not support NAC have been stored in the BD-ROM 1, and PlayList information, Clip information and AV data are selected in accordance with the playback capability of the playback apparatus. As a result, a playback apparatus supporting NAC plays back the AV data including NAC using the PlayList information and the Clip information that support NAC, whereas a playback apparatus not supporting NAC plays back the AV data not including NAC using the PlayList information and the Clip information that do not support NAC. Consequently, playback failures of the playback apparatus not supporting NAC, due to presence of the NAC stream in the AV data, can be prevented.

Also, in a case where the existing playback apparatus not supporting NAC erroneously plays back the PlayList supporting NAC and erroneously judges NAC to satisfy the condition A when selecting an audio stream to be played back (i.e., the NAC stream given the highest priority), the playback apparatus does not select the NAC stream as the audio stream to play back.

This is because the priority of the conventionally-encoded stream, which is immediately prior to the NAC stream and has the same language code and number of channels with the NAC stream, is as high as the NAC stream, and accordingly, the conventionally-encoded stream can be decoded by the existing playback apparatus. Accordingly, the playback apparatus selects the audio stream corresponding to the first stream number among those with the highest priority, that is, selects the conventionally-encoded stream.

Also, in a case where the language registered in audio_language_code as a language attribute is, for example, Chinese, a problem may occur. This is because ISO 639-2/T defines only one kind of Chinese as audio_language_code although, in reality, there are various kinds of Chinese languages such as Mandarin, Cantonese, Shanghainese, Fujian dialect, and Taiwanese. Accordingly, for instance, when three kinds of Chinese audio streams, which are in Cantonese, Shanghainese, and Fijian dialect, respectively, are multiplexed into one AV stream, the same value which represents "Chinese" is registered to the audio_language_code for these audio streams. As a result, these languages cannot be distinguished from one another based on the audio_language_code.

According to the present embodiment, in the ES_table there is always a conventionally-encoded stream paired with the NAC stream. Accordingly, which NAC audio stream corresponds to which conventionally-encoded audio stream can be easily determined.

Also, in the case where an interface standard such as S/PDIF or HDMI does not support NAC, the playback apparatus is not able to output the NAC stream to an external device (perform pass-through output). Thus, in order to output the NAC stream in a digital format, the NAC audio stream needs to be converted, after being decoded, to a format that can be transmitted using the existing interface standard (for example, two-channel LPCM, etc.), and then output. In other words, even in the case where the number of channels of the NAC stream is, for example, 5.1 ch, only two-channel LPCM can be output as digital output using S/PDIF.

According to the present embodiment, if the stream entry of the NAC stream and the stream entry of the audio stream which is immediately prior to the NAC stream in the order of the stream entries and has been encoded in an existing encoding format have the same priority, the audio stream encoded in the existing encoding format is selected. Thus, even when the interface standard does not support NAC, playback of audio with 5.1 ch or the like can be realized.

(Modification)

The BD-ROM 1 has been recorded with the file (00001.m2ts) storing the digital stream including the NAC stream multiplexed therein and the file (00002.m2ts) storing the digital stream including no NAC stream multiplexed therein.

However, in the case where the only difference between the file (00001.m2ts) and the file (00002.m2ts) is whether the NAC stream is multiplexed in the stored digital stream or not, that is to say, audio streams, video streams and the like other than the NAC stream are the same, recording both of the file (00001.m2ts) and the file (00002.m2ts) unnecessarily increases the size of the AV data to be recorded on the BD-ROM 1. A modification using a Virtual Package function to solve this problem will be described in the following.

The Virtual package is a technique to process data which is not recorded on the BD-ROM 1 as if the data is recorded thereon by combining the recorded content of the BD-ROM with the recorded content of a local storage (e.g., HDD) in the playback apparatus 1000.

Figure 19:
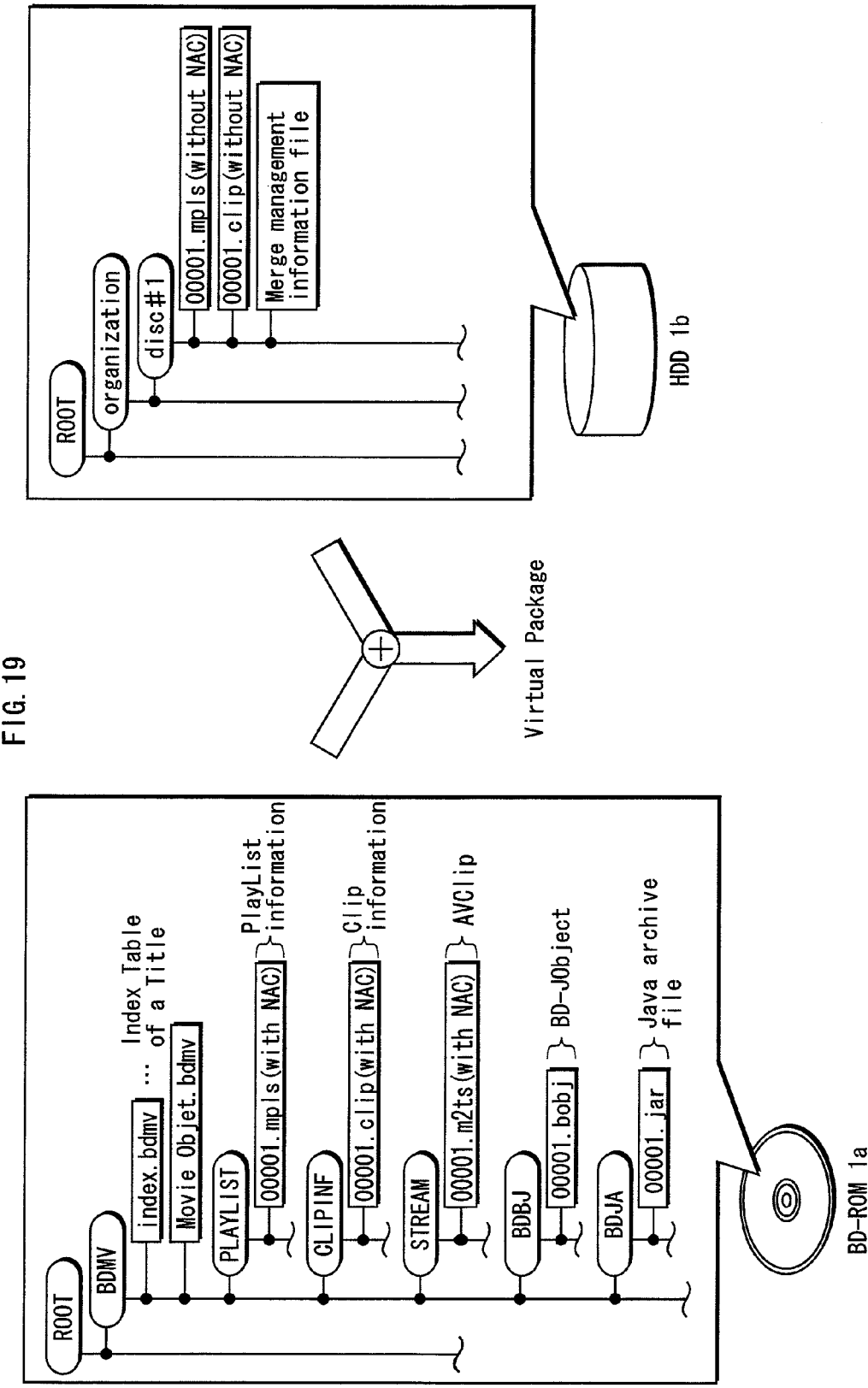
FIG. 19 shows data structures of a BD-ROM 1$a$ and an HDD 1$b$.

FIG. 19 shows the data structure of a BD-ROM 1a and an HDD 1b.

The difference between the BD-ROM 1 and the BD-ROM 1a is whether files with the file name "00002" are stored or not. In the BD-ROM 1a, each directory directly under the BDMV directory includes files having a file name containing "00001". Also, the digital stream stored in the file (00001.m2ts) includes the NAC stream, and the file (00001.mpls (with NAC)) and the file (00001.clip (with NAC)) correspond to the file (00001.m2ts) and contain information on the NAC stream.

On the other hand, in the HDD 1b, there is a subdirectory "organization" under the ROOT directory, and under the "organization" subdirectory, there is a subdirectory "disc#1".

The "organization" directory is allocated for a particular provider of a movie. The "disc#1" directory is allocated for each BD-ROM provided by the provider.

The directory "disc#1" stores the file (00001.mpls (without NAC) corresponding to the file (00001.m2ts) and including no information on the NAC stream, the file (00001.clip (without NAC)), and a merge management information file that stores merge management information.

The merge management information uniquely indicates files constituting the Virtual Package, among files included in the "disc#1" directory in the HDD 1b. The merge management information file includes storage position information of each of the files, on the HDD 1b, constituting the Virtual Package. Each piece of storage position information is composed of an "identifier" for accessing each file as the Virtual Package and a "file path" indicating the storage position of the file on the HDD 1b.

Described below is how to dynamically switch between (a) the file (00001.mpls (with NAC)) and the file (00001.clip (with NAC)) that support NAC and (b) the file (00001.mpls (without NAC)) and the file (00001.clip (without NAC)) that do not support NAC.

The Index table includes a special title called "FIRST PLAYBACK TITLE" that is first activated when a disc is inserted into the playback apparatus.

The BD-J application (not depicted) called up by the "FIRST PLAYBACK TITLE" judges whether the playback apparatus has capability to decode the NAC stream or not, based on, for example, the field value, of the Player capability of PSR 15, which indicates whether being capable of decoding the NAC stream or not.

If it is judged that the playback apparatus is capable of decoding the NAC stream, the playback apparatus starts playback using the file (00001.m2ts), the file (00001.mpls (with NAC)), the file (00001.clip (with NAC) and the like recorded on the BD-ROM.

If it is judged that the playback apparatus is not capable of decoding the NAC stream, the BD-J application creates the Virtual Package based on the merge management information. Here, the file (00001.mpls (without NAC)) and the file (00001.clip (without NAC)) have the common file names with the file (00001.mpls (with NAC)) and the file (00001.clip (with NAC)). Accordingly, if the directory indicated by the "identifier" for accessing the file (00001.mpls (without NAC)) as the Virtual Package and the directory of the file (00001.mpls (with NAC)) are the same, the file (00001.mpls (with NAC)) can be replaced by the file (00001.mpls (without NAC)). Similar processing is performed with the file (00001.clip (without NAC)) and the file (00001.clip (with NAC)).

As described above, if the playback apparatus does not support NAC, the BD-J application creates the Virtual Package, thereby replacing the file (00001.mpls (with NAC)) and the file (00001.clip (with NAC)) by the file (00001.mpls (without NAC)) and the file (00001.clip (without NAC)), and starts playback.

The playback apparatus capable of decoding the NAC stream performs playback using the PlayList, Clip information and others that support NAC. On the other hand, the playback apparatus not capable of decoding the NAC stream replaces the file (00001.mpls (with NAC)) and the file (00001.clip (with NAC)) by the file (00001.mpls (without NAC)) and the file (00001.clip (without NAC)) before playback. This way, even in the case where PlayList and Clip information without information on NAC are not included in the BD-ROM 1a, the PlayList and the Clip information can still be used to perform the playback.

Consequently, the playback apparatus not supporting NAC can avoid failures due to incompatibility when playing back the BD-ROM 1a having recorded the AV data including the NAC stream, while at the same time the amount of AV data recorded on the BD-Rom 1a can be reduced.

It should be noted that although the HDD 1b has been described as an example of a local storage, the local storage is not limited to the HDD 1b, and for example, can be a directory other than the BDMV directory of the BD-Rom 1a.

It should also be noted that while, in the explanation above, the BD-J application for creating the Virtual Package is executed from the First Playback Title, it is not limited to this, and the Virtual Package can be created by similar processing from a Title other than the First Playback Title.

(Second Embodiment)

Figure 20:
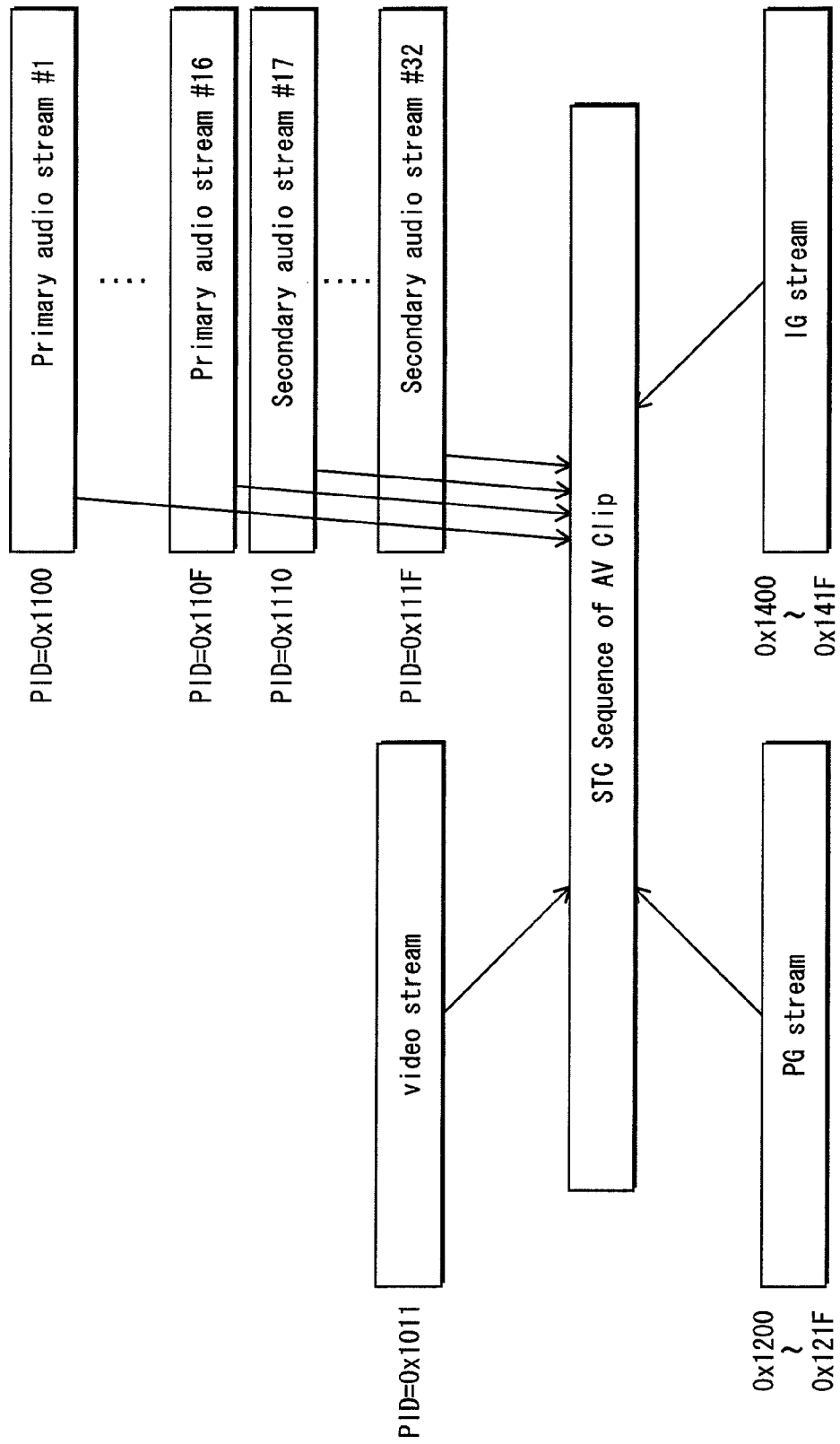
FIG. 20 shows elementary streams that are multiplexed into an AVClip in a second embodiment.

The following describes a case where the digital stream includes a Secondary audio stream. FIG. 20 shows elementary streams that are multiplexed into an AVClip in the second embodiment.

As shown in FIG. 20, multiplexed into the AVClip are: a high-image-quality video stream having PID of 0x1011; Primary audio streams having PIDs of 0x1100 to 0x110F; Secondary audio streams having PIDs of 0x1110 to 0x111F; PG streams having PIDs of 0x1200 to 0x121F; and IG streams having PIDs of 0x1400 to 0x141F.

The following describes details of "ES_table" in the present embodiment.

FIG. 21 shows the internal structure of the ES_table. Basically, it is the same as that of the ES_table shown by FIG. 5. The difference from the ES_table in FIG. 5 is that each stream_entry-stream_attributes includes Comb_info_Sequence_audio_Primary_audio.

Figures 22A, 22B:
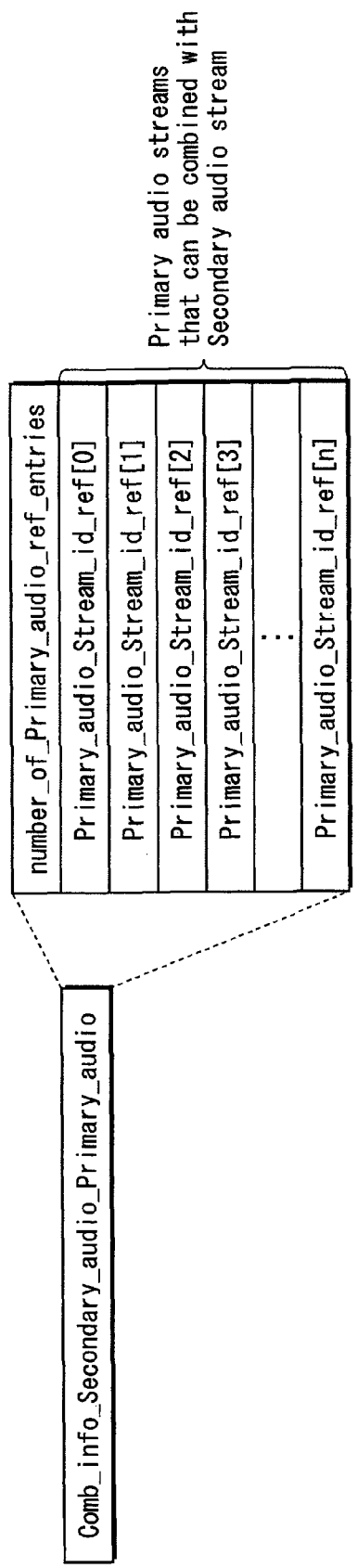
FIG. 22A shows an internal structure of Comb_info_Secondary_audio_Primary_audio.
FIG. 22B shows an example of the Comb_info_Secondary_audio_Primary_audio.

FIG. 22A shows the internal structure of the Comb_info_Secondary_audio_Primary_audio. The Comb_info_Secondary_audio_Primary_audio includes number_of_primary_audio_stream_ref_entries that indicates the total number of Primary audio streams which can be combined; and Primary_audio_stream_id_ref[0]-[n] that indicates stream numbers of the Primary audio streams which can be combined during playback.

As described above, the Comb_info_Secondary_audio_Primary_audio set for each playable Secondary audio stream uniquely specifies one or more Primary audio streams with which the playback output of the Secondary audio stream can be mixed. As a result, whether mixing can be performed or not in accordance with the audio attribute can be set during an authoring operation as follows: when playing back a Primary audio stream having a predetermined attribute, the Secondary audio stream is not mixed, and when playing back a Primary audio stream having other attributes, the Secondary audio stream can be mixed.

Here, the entry order for the Primary audio_stream_id_ref is important. The first Primary_audio_stream_id_ref in the order of entry needs to be Primary_audio_stream_id_ref that indicates a stream number of a conventionally-encoded stream, if the stream number of the NAC stream is first in the order of entry, the NAC stream will be selected to be mixed with the playback output of the Secondary audio stream.

FIG. 22B shows an example of Comb_info_Secondary_audio_Primary_audio. As shown by FIG. 21, the audio stream that has been encoded in AC3 and has the stream number of 00000001 is the first in the order of entry, and after that is the entry of the audio stream that has been encoded in NAC and has the stream number of 00000010.

(Third Embodiment)

In the third embodiment, an embodiment of the recording apparatus and recording method of the present invention is described.

The recording apparatus is so-called an authoring apparatus which is installed at production studios for distributing motion picture contents, generates digital streams which are compression encoded in accordance with MPEG standard and scenarios which describe how to play back motion picture Titles, and generates, for BD-ROM, a volume image including these. The recording apparatus generates the recording medium described in the first or the second embodiment.

FIG. 23 shows the internal structure of a recording apparatus 3000. As shown in the figure, the recording apparatus 3000 includes a video encoder 3001, a material production unit 3002, a scenario generation unit 3003, a BD program production unit 3004, a multiplexing unit 3005, and a format processing unit 3006.

The video encoder 3001 creates video streams by encoding video images such as uncompressed bit map in accordance with a compression standard such as MPEG4-AVC and MPEG2.

The material production unit 3002 creates streams such as audio streams, presentation graphics streams, and interactive graphics streams. More specifically, the material production unit 3002 creates audio streams by encoding uncompressed Linear PCM audio and the like in accordance with a compression standard such as AC3, DTS, or NAC.

When creating a NAC stream, the material production unit 3002 also creates a conventionally-encoded stream which has been encoded from the same audio source as the NAC stream. Here, the language and the number of channels are set to be the same between the NAC stream and the conventionally-encoded stream.

The material production unit 3002 also creates presentation graphics streams which are formats of subtitle streams conforming to the BD-ROM standard, based on a subtitle information file which includes subtitle images, presentation timing, and subtitle effects such as fade-in/fade-out.

Furthermore, the material production unit 3002 creates interactive graphics streams which are formats of menu screens conforming to the BD-ROM standard, based on bitmap images used for the menu and a menu file describing transition of buttons on the menu and presentation effects.

The scenario generation unit 3003 creates scenarios in a format conforming to the BD-ROM standard in accordance with information on the streams created by the material production unit 3002 or a user operation. Here, the scenarios correspond to files such as the Index File; Movie Object file-, and PlayList file.

Here, a syntax of the stream_attributes( ) of the ES_table is described. FIG. 24 shows the syntax of the stream_attributes( ). Each stream_attributes ( ) shown in FIG. 7 is generated based on this syntax. The coding_type of the stream_attributes indicates the type of each elementary stream, that is, if the elementary stream is a video stream, in which one of MPEG4-AVC, MPEG2, and VC1 the elementary stream has been compressed, and if the elementary stream is an audio stream, in which one of AC3, DTS, LPCM, and NAC the elementary stream has been compressed.

If the coding_type is one of MPEG4-AVC, MPEG2, and VC1, the coding type is followed by video_format and frame_rate fields.

If the coding_type is one of AC3, DTS, LPCM, and NAC, the coding_type is followed by presentation_type, smpling_frequency, and audio_language_code fields.

In this syntax, NAC is newly defined. Accordingly, the playback apparatus supporting NAC is able to read the fields subsequent to NAC appropriately and play back the NAC stream.

However, with this field structure, the following should be noted: if the coding_type has been already defined, the stream can be played back since the fields following the coding_type can be appropriately read; however, for example, if, in addition to the defined NAC, another NAC (hereinafter, referred to as "undefined NAC") is added in the future, a problem may occur. This is because although the undefined NAC can be registered as the coding_type in the field structure, the playback apparatus which does not recognize the undefined NAC is unlikely to be able to conduct further analysis of the stream_attributes.

In view of this, if the undefined NAC is set, the coding_type field is interpreted as padding, as shown in FIG. 24. Specifically, the playback apparatus not supporting the undefined NAC handles the coding_type field containing the undefined NAC as unknown, and thus, reads the coding_type as padding data in accordance with the field length described by the stream_attributes_length.

When a new video compression technique or an audio compression technique appears in the future, setting a padding field as described above will help prevent a playback apparatus from terminating analysis of the stream_attributes due to finding an unknown coding_type.

Additionally, when generating the ES_table, the stream_entry of the NAC stream which has been encoded from the same audio source as that of the conventionally-encoded stream is registered immediately after registering the stream_entry of the conventionally-encoded stream in the ES_table. The language code and the number of channels are set to be the same between the NAC stream and the conventionally-encoded stream Now referring back to FIG. 23, the scenario generation unit 3003 creates parameter files that describe which streams constitute which AVClip, to realize multiplexing processing. Here, the data structures of the created files such as Index file, MovieObject file, and PlayList file are as described in the first embodiment or the second embodiment.

The BD program production unit 3004 programs the BD programs, specifically, by creating a source code of the BD programs in accordance with request by a user through a user interface (e.g., GUI). Here, the created BD programs are the programs described in the first embodiment, such as the BD programs that realize the NAC audio stream setting function.

The multiplexing unit 3005 multiplexes multiple streams such as video streams, audio streams, presentation graphics streams, interactive graphics streams, and the like described in BD-ROM scenario data into an AVClip in MPEG2-TS format.

Additionally, when creating the AVClip, the multiplexing unit 3005 creates a Clip information file in correspondence with the AVClip at the same time. The structure of the Clip information file has the data structure described in the first embodiment.

Here, a syntax of the stream_code_inf( ) is described. FIG. 25 shows the syntax of the stream_code_info. The stream_code_inf( ) is generated based on this syntax. The stream_code_inf( ) includes: stream_code_info_length that indicates the field length of the stream_code_inf( ); coding_type that indicates the type of the registered elementary stream; and fields in which attribute information in accordance with each coding_type is registered.

Here, as is the case with the syntax of the stream_attributes( ), if a new, undefined NAC is added, the field will be interpreted as padding.

Referring back to FIG. 23, the format processing unit 3006 arranges the following in a format conforming to the BD-ROM standard, thereby generating a disc image in the UDF format which is a file system conforming to the BD-ROM standard: the BD-ROM scenario data generated by the scenario generation unit 3003, the BD program file storing the BD programs created by the BD program production unit 3004; and the AVClip, Clip information file and the like generated by the multiplexing processing unit 3005. The generated disc image is converted to data for BD-ROM pressing, and a BD-ROM can be manufactured by performing pressing processing on this data.

<Additional Remarks>

Up to now, the recording medium of the present invention has been described based on the embodiments. However, the present invention is not limited to the above-described embodiments.

(1) Described below is a method to decrease a calculation amount of DRA. DRA is one of audio compression formats China has been working to standardize, and is going to be introduced into some products such as headphone stereos and karaoke equipment.

When adding DRA to audio CODEC such as AC3 or DTS already included in the standards, it is preferable that its calculation amount be suppressed to no more than that of AC3 or DTS.

Next, a method for determining the amount of calculation required for DRA is specifically described. The calculation amount of DRA increases with increase of the value indicated as (Fs×Ch×nCtr). Here, Fs indicates a sampling frequency of an audio signal, Ch indicates a number of channels of the audio signal, and nCtr indicates a number of exceptional processing.

The following describes details of nCtr. According to DRA, Huffman encoding is used in various fields to compress data size. FIG. 26 is an example of a table indicating correspondence between Huffman-coded values (H) and field values. As shown in FIG. 26, when a compression target field (X) is one of alphabets A to Z, Huffman-coded values (H) of A to D are defined as 0b, 01b, 0010b, and 0011b, respectively, whereas alphabets other than A to D are collectively defined as 00000b. In other words, when a field has one of values from A to D, there is a Huffman code corresponding the value; all other values are regarded as exceptions and defined as 00000b according to the Huffman code.

According to many compression formats including DRA, Huffman codes are assigned one-to-one to values which are likely to appear as X, while, for values which are unlikely to appear as X (alphabets E to Z in the present example), separate processing is often performed to calculate the value of X.

Figure 27:
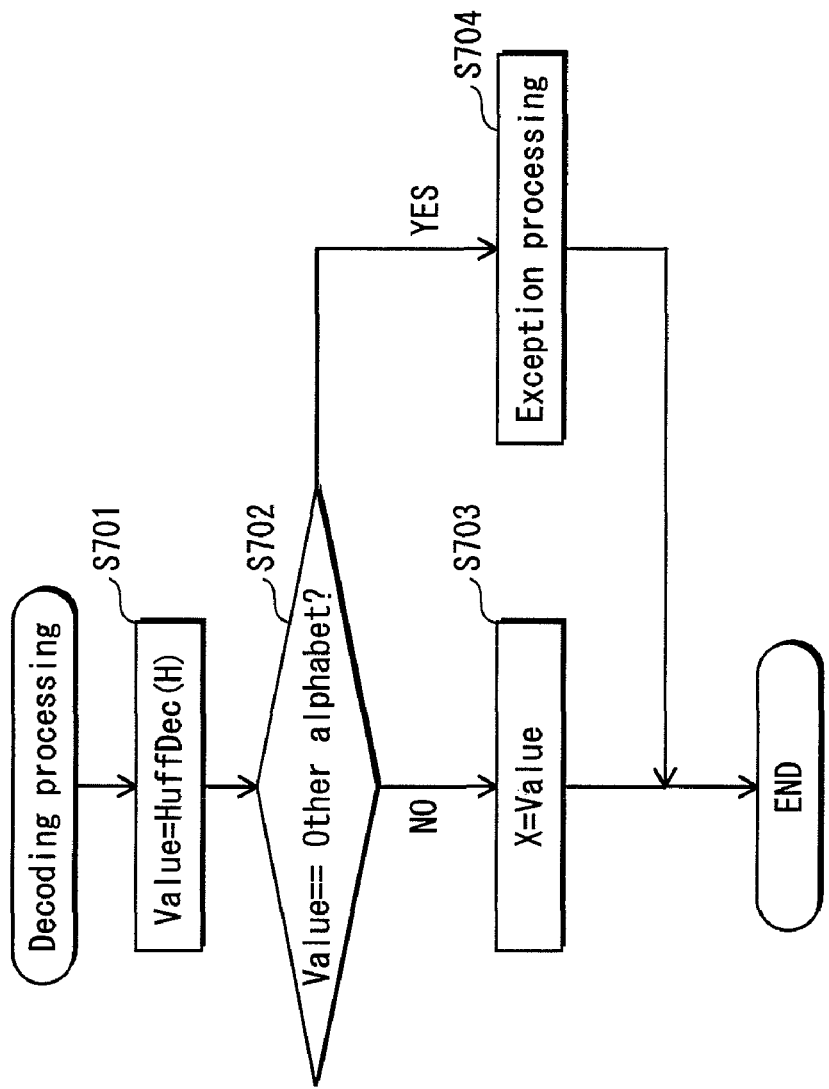
FIG. 27 shows a decoding procedure.

FIG. 27 shows a decoding procedure. A Huffman-coded value (H) is decoded (HuffDec) according to the table of FIG. 26, obtaining value (step S701). After that, it is determined whether Value is an exceptional value (Other Alphabet) (step S702). If Value is determined not to be an exceptional value (No at step S702), Value which is the value obtained as a result of the Huffman decoding becomes X described above (step S703).

If Value is judged to be an exceptional value (Yes at step S702), exceptional processing is executed (step S704).

When considering the calculation amount, it is important to realize the following: when the values are processed with the normal processing, that is, when Filed Value (X) is one of A to D, the value of X can be determined with relatively small amount of processing according to the Huffman code table shown in FIG. 24; however, when FiledValue (X) is an exceptional value, that is, Other Alphabet (Huffman-coded value is 00000b), exception processing occurs, and in general, the processing amount required for this exception processing is larger than the processing amount of the above-described Huffman decoding. In other words, in order to restrict the calculation amount of DRA, it is preferable to restrict the number of exception processing indicated as nCtr. Accordingly, it is preferable, in order to keep the calculation amount of DRA less than a predetermined amount, to restrict the value of nCtr to no more than a predetermined value, or also in view of increase of processing amount depending on the Ch number and sampling frequency, to restrict the value of (Fs×Ch×nCtr) to no more than a predetermined value.

(2) Next, problems occurring at seamless connection points specified by the BD-ROM standards due to introduction of DRA, and solutions therefor are described.

FIG. 28 shows a relationship between a Video access unit and an Audio access unit in the case where two pieces of AV data are sequentially played back (seamless playback). In FIG. 28, of the two pieces of seamless connected AV data, TS1 is the first piece of AV data, and TS2 is the second piece of AV data seamlessly played back immediately after the first piece of AV data, with access units arranged in the display order of Video, i.e., in the order of PTS (Presentation Time Stamp). For example, if the video is of 24P, each access unit indicates ¹⁄₂₄ second. However, each audio access unit has a different duration from that of Video, and thus, an access unit crosses the connection point of Video (Connection point).

Here, according to the BD-ROM standards, an audio access unit of TS1 and an audio access unit of TS2 are allowed to overlap with each other on the time axis at the Connection point (Audio overlap).

However, depending on the implementation of the playback apparatus, for example, the last Audio access unit of TS1 and the first access unit of TS2 may need to be decoded simultaneously at the connection point, which results in an increase of the processing amount at the connection point.

While the calculation amount of DRA mentioned above is calculated as (Fs×Ch×nCtr), as described above, it is preferable that the value of nCtr or (Fs×Ch×nCtr) be set to no more than a prescribed value in order to avoid an increase of the processing amount at the connection point. For example, for audio access units of TS1 and TS2 overlapping with each other at the seamless point, nCtr or (Fs×Ch×nCtr) may be restricted to half of the restriction value of nCtr or (Fs×Ch×nCtr) of a non-overlapping part; or a sum of the value of nCtr or (Fs×Ch×nCtr) of the overlapping audio access unit of TS1 and the value of nCtr or (Fs×Ch×nCtr) of the overlapping audio access unit of TS2 can be restricted to a prescribed value.

(3) According to the above-described embodiments, a field DRA Capability, which indicates whether DRA is playable or not, is newly defined, as NAC Capability, in Player Capability of PSR 15 of the playback apparatus 1000. However, not limited to this, NAC Capability is acceptable as long as it is related to whether NAC is playable or not. For example, NAC Capability may be defined to indicate, when there are 48 kHz and 96 kHz for NAC, whether each of these is playable or not, whether only two-channel playback is supported or multi-channel playback is also supported, and the like.

(4) According to the above-described embodiments, in the ES_table, the NAC stream is paired with the corresponding conventionally-encoded stream. However, when there is more than one kind of NAC, the second NAC stream encoded in the second NAC may be immediately subsequent to the first NAC stream encoded in the first NAC which is paired with the conventionally-encoded stream. It is preferable that the first NAC stream and the second NAC stream be encoded from the same audio source and have the same language code and the same number of channels.

The present invention may be any combination of the above-described embodiments and additional remarks.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A non-transitory computer-readable recording medium having recorded thereon one or more pieces of playlist information each for defining a playback section on a time axis of a digital stream, wherein each of the pieces of playlist information includes (a) information defining a pair of a playback start point and a playback end point on a time axis of a video stream and (b) a stream table that includes a plurality of stream entries corresponding one-to-one with a plurality of audio streams and that defines an order of the plurality of stream entries, in each stream table, the order of the stream entries indicates a priority, of each of the plurality of audio streams, to which a playback apparatus that plays back the recording medium refers when selecting an audio stream to play back synchronously with the video stream among the plurality of audio streams, each of the plurality of audio streams has been encoded in one of a mandatory format and an optional format, the mandatory format being an encoding format decodable by a playback apparatus with any version number, and the optional format being an encoding format decodable by a playback apparatus with a predetermined or higher version number, and in a first-type stream table included in a piece of first-type playlist information among the pieces of playlist information, a stream entry corresponding to an audio stream encoded in the optional format is immediately subsequent, in the order of the stream entries, to a stream entry corresponding to an audio stream encoded in the mandatory format, the audio stream encoded in the optional format and the audio stream encoded in the mandatory format having been encoded from a same audio source and having a same language code, the plurality of audio streams include a plurality of primary audio streams and one or more secondary audio streams, each stream entry corresponding to a respective one of the one or more secondary audio streams is associated with a piece of combination information that indicates, in a predetermined order, one or more stream numbers corresponding to one or more of the plurality of primary audio streams whose playback output is able to be mixed with a playback output of the secondary audio stream, and in each piece of combination information, the predetermined order of the one or more stream numbers indicates a priority, of each of the one or more primary audio streams, to which the playback apparatus that plays back the recording medium refers when selecting a primary audio stream to play back synchronously with the secondary audio stream, and a first stream number in the predetermined order of the one or more stream numbers is a stream number of a primary audio stream having been encoded in the mandatory format.

2. The non-transitory computer-readable recording medium of claim 1 having further recorded thereon a playlist selection program which the playback apparatus playing back the recording medium executes when performing a playlist playback, wherein a second-type stream table included in a piece of second-type playlist information among the pieces of playlist information includes the plurality of stream entries that correspond one-to-one with audio streams encoded in the mandatory format, each of the pieces of playlist information includes a version number, and if the version number of the playback apparatus playing back the recording medium is equal to or higher than a version number included in the piece of first-type playlist information, the playlist selection program causes the playback apparatus playing back the recording medium to execute the playlist playback based on the piece of first-type playlist information.

3. The non-transitory computer-readable recording medium of claim 2 having further recorded thereon (a) first-type clip information including first-type audio stream attribute information that indicates attribute information of the plurality of audio streams corresponding to the plurality of stream entries included in the first-type stream table and (b) second-type clip information including second-type audio stream attribute information that indicates attribute information of the plurality of audio streams corresponding to the plurality of stream entries included in the second stream table, wherein the first-type audio stream attribute information is referred to in order to execute the playlist playback based on the piece of first-type playlist information.

4. The non-transitory computer-readable recording medium of claim 1 having further recorded thereon an audio stream setting program which the playback apparatus playing back the recording medium executes when performing a playlist playback, wherein the audio stream setting program causes the playback apparatus playing back the recording medium to display a menu for receiving, from a user, an operation to select an audio stream encoded in the optional format, and if the operation is received from the user, the audio stream setting program causes the playback apparatus playing back the recording medium to set the selected audio stream as the audio stream to play back.

5. A recording apparatus comprising:
a generating unit operable to generate playlist information; and
a recording unit operable to record the generated playlist information on a recording medium, wherein
the playlist information, which is for defining a playback section on a time axis of a digital stream, includes (a) information defining a pair of a playback start point and a playback end point on a time axis of a video stream and (b) a stream table defining an order of a plurality of stream entries included therein,
the generating unit generates the stream table in a manner that a stream entry corresponding to an audio stream encoded in an optional format is immediately subsequent, in the order of the stream entries, to a stream entry corresponding to an audio stream encoded in a mandatory format, the audio stream encoded in the optional format and the audio stream encoded in the mandatory format having been encoded from a same audio source and having a same language code,
the order of the stream entries in the stream table indicates a priority, of each of the plurality of audio streams, to which a playback apparatus that plays back the recording medium refers when selecting an audio stream to play back synchronously with the video stream among the plurality of audio streams, and
the mandatory format is an encoding format decodable by a playback apparatus with any version number, and the optional format is an encoding format decodable by a playback apparatus with a predetermined or higher version number,
the plurality of audio streams include a plurality of primary audio streams and one or more secondary audio streams,
each stream entry corresponding to a respective one of the one or more secondary audio streams is associated with a piece of combination information that indicates, in a predetermined order, one or more stream numbers corresponding to one or more of the plurality of primary audio streams whose playback output is able to be mixed with a playback output of the secondary audio stream, and
in each piece of combination information, the predetermined order of the one or more stream numbers indicates a priority, of each of the one or more primary audio streams, to which the playback apparatus that plays back the recording medium refers when selecting a primary audio stream to play back synchronously with the secondary audio stream, and a first stream number in the predetermined order of the one or more stream numbers is a stream number of a primary audio stream having been encoded in the mandatory format.

6. A recording method comprising:
a generating step of generating playlist information; and
a recording step of recording the generated playlist information on a recording medium, wherein
the playlist information, which is for defining a playback section on a time axis of a digital stream, includes (a) information defining a pair of a playback start point and a playback end point on a time axis of a video stream and (b) a stream table defining an order of a plurality of stream entries included therein,
the generating step generates the stream table in a manner that a stream entry corresponding to an audio stream encoded in an optional format is immediately subsequent, in the order of the stream entries, to a stream entry corresponding to an audio stream encoded in a mandatory format, the audio stream encoded in the optional format and the audio stream encoded in the mandatory format having been encoded from a same audio source and having a same language code,
the order of the stream entries in the stream table indicates a priority, of each of the plurality of audio streams, to which a playback apparatus that plays back the recording medium refers when selecting an audio stream to play back synchronously with the video stream among the plurality of audio streams,
the mandatory format is an encoding format decodable by a playback apparatus with any version number, and the optional format is an encoding format decodable by a playback apparatus with a predetermined or higher version number,
the plurality of audio streams include a plurality of primary audio streams and one or more secondary audio streams,
each stream entry corresponding to a respective one of the one or more secondary audio streams is associated with a piece of combination information that indicates, in a predetermined order, one or more stream numbers corresponding to one or more of the plurality of primary audio streams whose playback output is able to be mixed with a playback output of the secondary audio stream, and
in each piece of combination information, the predetermined order of the one or more stream numbers indicates a priority, of each of the one or more primary audio streams, to which the playback apparatus that plays back the recording medium refers when selecting a primary audio stream to play back synchronously with the secondary audio stream, and a first stream number in the predetermined order of the one or more stream numbers is a stream number of a primary audio stream having been encoded in the mandatory format.

7. A playback apparatus for reading a digital stream from a recording medium and playing back the read digital stream, the recording medium having recorded thereon the digital stream having a plurality of audio streams multiplexed therein, a playlist selection program, first-type playlist information, and second-type playlist information, the playback apparatus comprising:
a first judgment unit operable to judge, by executing the playlist selection program, whether a version number set in the playback apparatus is equal to or higher than a version number included in the first-type playlist information,
a second judgment unit operable to, if the first judgment unit judges affirmatively, judge, for each of audio streams entered in a first-type stream table included in the first-type playlist information, which one or more of three conditions the audio stream satisfies, the three conditions being: (a) the playback apparatus has capability to playback the audio stream, (b) a language attribute of the audio stream matches a language setting in the playback apparatus, and (c) a channel attribute of the audio stream matches a channel attribute set in the playback apparatus; and
a playback unit operable to assign a priority to each of the audio streams in accordance with a result of the judgment by the second judgment unit, selects an audio stream assigned a highest priority, and plays back the selected audio stream,
the first-type stream table includes a stream entry of an audio stream encoded in an optional format and a stream entry of an audio stream encoded in a mandatory format,
a second-type stream table included in the second-type playlist information includes a plurality of stream entries that correspond one-to-one with a plurality of audio streams encoded in the mandatory format, and the mandatory format is an encoding format decodable by a playback apparatus with any version number, and the optional format is an encoding format decodable by a playback apparatus with a predetermined or higher version number.

8. The playback apparatus of claim 7 further comprising:

a Huffman code table in which field values correspond one-to-one with Huffman-coded values, the playback unit decodes a Huffman-coded value based on the Huffman code table, and if a value obtained by the decoding is an exception value, the playback unit performs exception processing to calculate a field value, and when decoding the audio stream encoded in the optional format, the playback unit performs the exception processing no more than a predetermined number of times.

* * * * *